(12) United States Patent
Wu et al.

(10) Patent No.: US 9,376,612 B2
(45) Date of Patent: Jun. 28, 2016

(54) TCDA/ZINC OXIDE NANOCOMPOSITES AND FILM SENSORS

(71) Applicant: NEW JERSEY INSTITUTE OF TECHNOLOGY, Newark, NJ (US)

(72) Inventors: Aide Wu, Kearny, NJ (US); Zafar Iqbal, Morris Plains, NJ (US); John Federici, Westfield, NJ (US)

(73) Assignee: NEW JERSEY INSTITUTE OF TECHNOLOGY, Newark, NJ (US)

( * ) Notice: Subject to any disclaimer, the term of this patent is extended or adjusted under 35 U.S.C. 154(b) by 0 days.

(21) Appl. No.: 14/471,463

(22) Filed: Aug. 28, 2014

(65) Prior Publication Data

US 2016/0060511 A1 Mar. 3, 2016

(51) Int. Cl.

| G06K 19/06 | (2006.01) |
|---|---|
| C09K 9/02 | (2006.01) |
| B05D 1/02 | (2006.01) |
| B05D 3/06 | (2006.01) |
| G01K 11/16 | (2006.01) |

(52) U.S. Cl.
CPC ... *C09K 9/02* (2013.01); *B05D 1/02* (2013.01); *B05D 3/067* (2013.01); *G01K 11/16* (2013.01); *C09K 2211/10* (2013.01); *C09K 2211/14* (2013.01)

(58) Field of Classification Search
CPC ................................ G01N 31/22; G01K 11/16
USPC ......................................................... 235/494
See application file for complete search history.

(56) References Cited

U.S. PATENT DOCUMENTS

| 8,546,301 | B2* | 10/2013 | Ribi | ....................... B41M 3/005 |
|---|---|---|---|---|
| | | | | 503/226 |
| 8,722,418 | B1* | 5/2014 | Zunino, III | ............ G01N 31/22 |
| | | | | 252/408.1 |
| 2015/0329656 | A1* | 11/2015 | Kim | ...................... C09D 149/00 |
| | | | | 524/547 |

OTHER PUBLICATIONS

Thoedtoon Champaiboon, et al., A polydiacetylene multilayer film for naked eye detection of aromatic compounds. Sensors and Actuators B: Chemical, Sensors and Actuators B 139, pp. 532-537 (2009).
Descalzo, A. B.; Dolores Marcos, M.; Monte, C.; Martinez-Manez, R.; Rurack, K., Mesoporous silica materials with covalently anchored phenoxazinone dyes as fluorescent hybrid materials for vapour sensing. Journal of Materials Chemistry, 17 (44), pp. 4716-4723 (2007).
Janzen, M. C.; Ponder, J. B.; Bailey, D. P.; Ingison, C. K.; Suslick, K. S., Colorimetric Sensor Arrays for Volatile organic Compounds. Analytical Chemistry, 78 (11), pp. 3591-360. 30 (2006).

(Continued)

*Primary Examiner* — Seung Lee
(74) *Attorney, Agent, or Firm* — Timothy X. Gibson, Esq.; Gibson & Dernier LLP

(57) ABSTRACT

Novel TCDA/ZnO compositions in which the ZnO particles have an average particle size less than 100 nm are disclosed. Reversible thermochromatic sensors employing the TCDA nanocomposites and methods of printing TCDA/ZnO nanocomposite thin films forming the reversible thermochromatic sensors using inkjet printing techniques are also disclosed.

21 Claims, 28 Drawing Sheets
(24 of 28 Drawing Sheet(s) Filed in Color)

(56) References Cited

OTHER PUBLICATIONS

Lu, Y.; Yang, Y.; Sellinger, A.; Lu, M.; Huang, J.; Fan, H.; Haddad, R.; Lopez, G.; Burns, A. R.; Sasaki, D. Y.; Shelnutt, J.; Brinker, C. J., Self-assembly of mesoscopically ordered chromatic polydiacetylene/silica nanocomposites. Nature, 410, pp. 913-917 (2001).

Muro, M. L.; Daws, C. A.; Castellano, F. N., Microarray pattern recognition based on PtII terpyridyl chloride complexes: vapochromic and vapoluminescent response. Chemical Communications, (46), pp. 6134-6136 (2008).

Rakow, N. A.; Suslick, K. S., A colorimetric sensor array for odour visualization. Nature vol. 406, pp. 710-713 (2000).

Carpick, R. W; Sasaki, D.Y.; Marcus, M.S.; Eriksson, M. A.; Burns, A.R., Polydiacetylene films: a review of recent investigations into chromogenic transitions and nanomechanical properties. Journal of Physics: Condensed Matter 16 (23), pp. R679-.R697 (2004).

Wenfang, Y.; Jiang, G.; Song, Y.; Jiang, L., Micropatterning of polydiacetylene based on a photoinduced chromatic transition and mechanism study. Journal of Applied Polymer Science, 102 (2), pp. 942-946. (2007).

Hammond, P. T.; Rubner, M. F., Thermochromism in Liquid Crystalline Polydiacetylenes. Macromolecules, 30 (19), 5773-5782 (1997).

Huang, X.; Jiang, S.; Liu, M., Metal Ion Modulated Organization and Function of the Langmuir-Blodgett Films of Amphiphilic Diacetylene: Photopolymerization, Thermochromism, and Supramolecular Chirality. The Journal of Physical Chemistry B, 109 (1), pp. 114-119 (2005).

Peng, H.; Tang, J.; Pang, J.; Chen, D.; Yang, L.; Ashbaugh, H. S.; Brinker, C. J.; Yang, Z.; Lu, Y., Polydiacetylene/Silica Nanocomposites with Tunable Mesostructure and Thermochromatism from Diacetylenic Assembling Molecules. Journal of the American Chemical Society, 127 (37), pp. 12782-12783 (2005).

Peng, H.; Tang, J.; Yang, L.; Pang, J.; Ashbaugh, H. S.; Brinker, C. J.; Yang, Z.; Lu, Y., Responsive Periodic Mesoporous Polydiacetylene/Silica Nanocomposites. Journal of the American Chemical Society, 128 (16), pp. 5304-5305 (2006).

Ahn, D. J.; Chae, E.-H.; Lee, G. S.; Shim, H.-Y.; Chang, T.-E.; Ahn, K.-D.; Kim, J.-M., Colorimetric Reversibility of Polydiacetylene Supramolecules Having Enhanced Hydrogen-Bonding under Thermal and pH Stimuli. Journal of the American Chemical Society, 125(30), pp. 8976-8977 (2003).

Kim, J.-M.; Lee, J.-S.; Choi, H.; Sohn, D.; Ahn, D. J., Rational Design and in-Situ FTIR Analyses of Colorimetrically Reversibe Polydiacetylene Supramolecules. Macromolecules, 38 (22), pp. 9366-9376 (2005).

Lee, S.; Kim, J. M., Alpha-cyclodextrin: A molecule for testing colorimetric reversibility of polydiacetylene supramolecules. Macromolecules, 40 (26), pp. 9201-9204 (2007).

Park, H.; Lee, J. S.; Choi, H.; Ahn, D. J.; Kim, J. M., Rational Design of Supramolecular Conjugated Polymers Displaying Unusual Colorimetric Stability upon Thermal Stress. Advanced Functional Materials, 17 (17), pp. 3447-3455 (2007).

Yuan, Z.; Lee, C.-W.; Lee, S.-H., Reversible Thermochromism in Hydrogen-Bonded Polymers Containing Polydiacetylenes. Angewandte Chemie, 116 (32), pp. 4293-4296. 31 (2004).

Gu, Y.; Cao, W.; Zhu, L.; Chen, D.; Jiang, M., Polymer mortar assisted self-assembly of nanocrystalline polydiacetylene bricks showing reversible thermochromism. Macromolecules, 41 (7), pp. 2299-2303 (2008).

Song, J.; Cisar, J. S.; Bertozzi, C. R., Functional Self-Assembling Bolaamphiphilic Polydiacetylenes as Colorimetric Sensor Scaffolds. Journal of the American Chemical Society, 126 (27), pp. 8459-8465 (2004).

Li, L. S.; Stupp, S. I., Two-Dimensional Supramolecular Assemblies of a Polydiacetylene. 2. Morphology, Structure, and Chromic Transitions. Macromolecules, 30 (18), pp. 5313-5320 (1997).

Yang, Y.; Lu, Y.; Lu, M.; Huang, J.; Haddad, R.; Xomeritakis, G.; Liu, N.; Malanoski, A. P.; Sturmayr, D.; Fan, H.; Sasaki, D. Y.; Assink, R. A.; Shelnutt, J. A.; van Swol, F.; Lopez, G. P.; Burns, A. R.; Brinker, C. J., Functional Nanocomposites Prepared by Self-Assembly and Polymerization of Diacetylene Surfactants and Silicic Acid. Journal of the American Chemical Society, 125 (5), pp. 1269-1277 (2003).

Baughman, R. H., Solid-state polymerization of diacetylenes. Journal of Applied Physics, 43 (11), pp. 4362-4370 (1972).

Lim, K. C.; Heeger, A. J., Spectroscopic and light scattering studies of the conformational (rod-to-coil) transition of poly (diacetylene) in solution. The Journal of Chemical Physics, 82 (1), pp. 522-530 (1985).

Chance, R. R.; Baughman, R. H.; Muller, H.; Eckhardt, C. J., Thermochromism in a polydiacetylene crystal. The Journal of Chemical Physics, 67 (8), pp. 3616-3618 (1977).

Patlolla, A.; Zunino, J.; Frenkel, A. I.; Iqbal, Z., Thermochromism in polydiacetylene-metal oxide nanocomposites. Journal of Materials Chemistry, 22 (14), pp. 7028-7035 (2012).

Lim C.; Sandman, D. J.; Sukwattanasinitt, M., Topological Polymerization of tert-Butylcalix[4]arenes Containing Diynes. Macromolecules, 41 (3), pp. 675-681 (2008).

D. Tobjörk, R. Österbacka, Paper Electronics. Advanced Materials, 23, pp. 1935-1961 (2011).

L. Nyholm, G. Nyström, A. Mihranyan, M. Strømme, Toward Flexible Polymer and Paper-Based Energy Storage Devices. Advanced Materials, 23, pp. 3751-3769 (2011).

A.C. Siegel, S.T. Phillips, M.D. Dickey, N. Lu, Z. Suo, G.M. Whitesides, Printable Electronics: Foldable Printed Circuit Boards on Paper Substrates. Advanced Functional Materials, 20, pp. 28-35 (2010).

J. Zschieschang, T. Yamamoto, K. Takimiya, H. Kuwabara, M. Ikeda, T. Sekitani, et al., Organic Electronics on Banknotes, Advanced Materials. 23, pp. 654-658 (2011).

A. Russo, B.Y. Ahn, J.J. Adams, E.B. Duoss, J.T. Bernhard, J.A. Lewis, Pen-on-Paper Flexible Electronics. Advanced Materials, 23, pp. 3426-3430 (2011).

M.C. Barr, J.A. Rowehl, R.R. Lunt, J. Xu, A. Wang, C.M. Boyce, et al., Direct Monolithic Integration of Organic Photovoltaic Circuits on Unmodified Paper. Advanced Materials, 23, pp. 3500-3505 (2011).

J. Jang, J. Ha, J. Cho, Fabrication of Water-Dispersible Polyaniline-Poly(4-styrenesulfonate) Nanoparticles for Inkjet-Printed Chemical-Sensor Applications. Advanced Materials, 19, pp. 1772-1775 (2007).

J.-H. Kang, Z. Xu, S.-M. Paek, F. Wang, S.-J. Hwang, J. Yoon, et al., A Dual-Polymer Electrochromic Device with High Coloration Efficiency and Fast Response Time: Poly(3,4-(1,4-butylene-(2-ene)dioxy)thiophene)—Polyaniline ECD. Chemistry—An Asian Journal, 6, pp. 2123-2129 (2011).

B.J. de Gans, P.C. Duineveld, U.S. Schubert, Inkjet Printing of Polymers: State of the Art and Future Developments. Advanced Materials, 16 (3), pp. 203-213 (2004).

T.H.J. van Osch, J. Perelaer, A.W.M. de Laat, U.S. Schubert, Inkjet Printing of Narrow Conductive Tracks on Untreated Polymeric Substrates. Advanced Materials, 20, pp. 343-345 (2008).

Y. Oh, J. Kim, Y.J. Yoon, H. Kim, H.G. Yoon, S.-N. Lee, et al., Inkjet printing of Al2O3 dots, lines, and films: From uniform dots to uniform films. Current Applied Physics, 11, pp. S359-S363 (2011).

J.K. Lee, U.J. Lee, M.-K. Kim, S.H. Lee, K.-T. Kang, Direct writing of semiconducting polythiophene and fullerene derivatives composite from bulk heterojunction solar cell by inkjet printing. Thin Solid Films, 519, pp. 5649-5653 (2011).

B. Yoon, D.-Y. Ham, O. Yarimaga, H. An, C.W. Lee, J.-M. Kim, Inkjet Printing of Conjugated Polymer Precursors on Paper Substrates for Colorimetric Sensing and Flexible Electrothermochromic Display. Advanced Materials, 23, pp. 5492-5497 (2011).

J. Chuang, Y. Hu, H. Ko, A Novel Secret Sharing Technique Using QR Code. International Journal of Image Processing, 4 (5), pp. 468-475 (2010).

\* cited by examiner

FIG. 6A  FIG. 6B
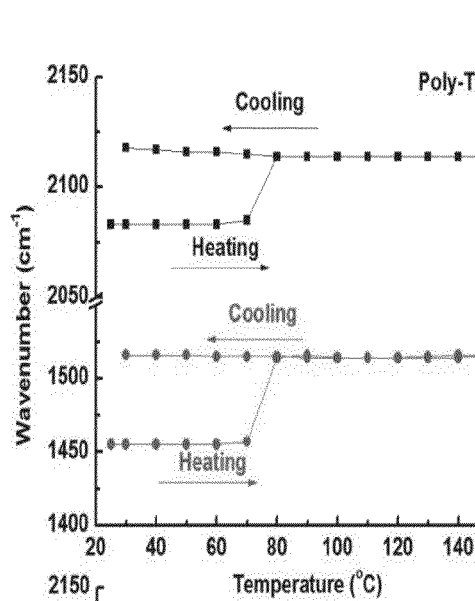
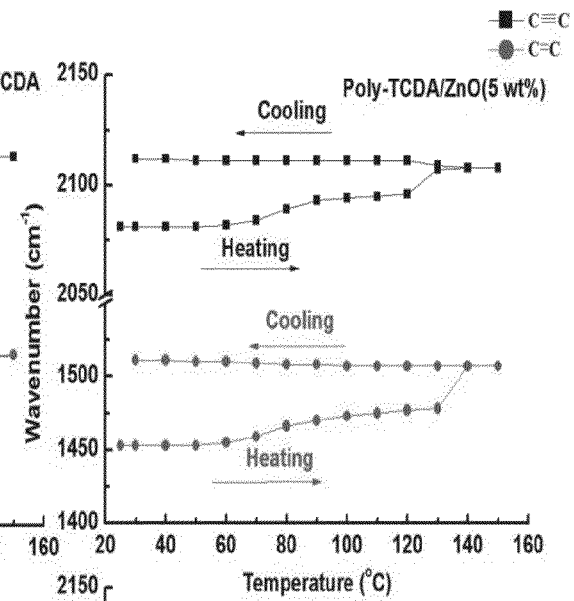
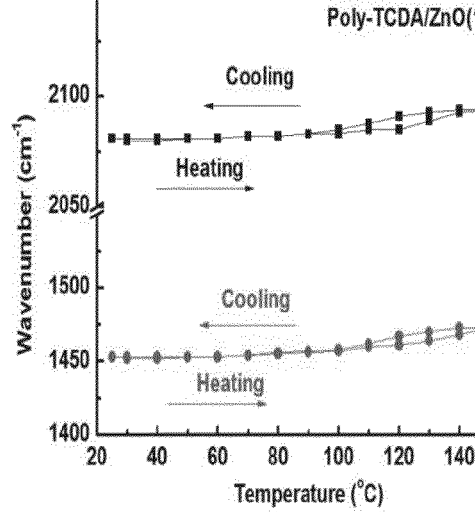
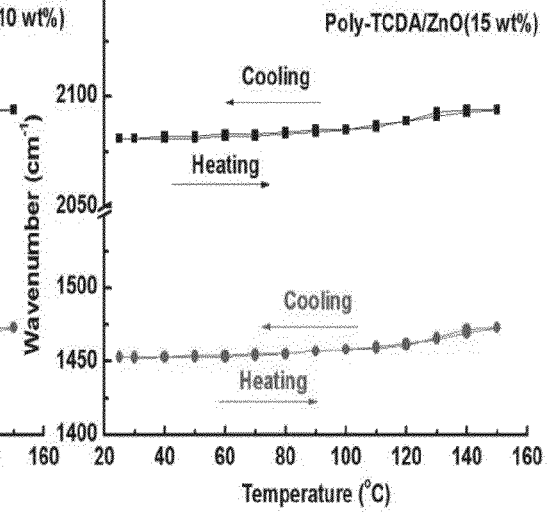
FIG. 6C  FIG. 6D

FIG. 16A
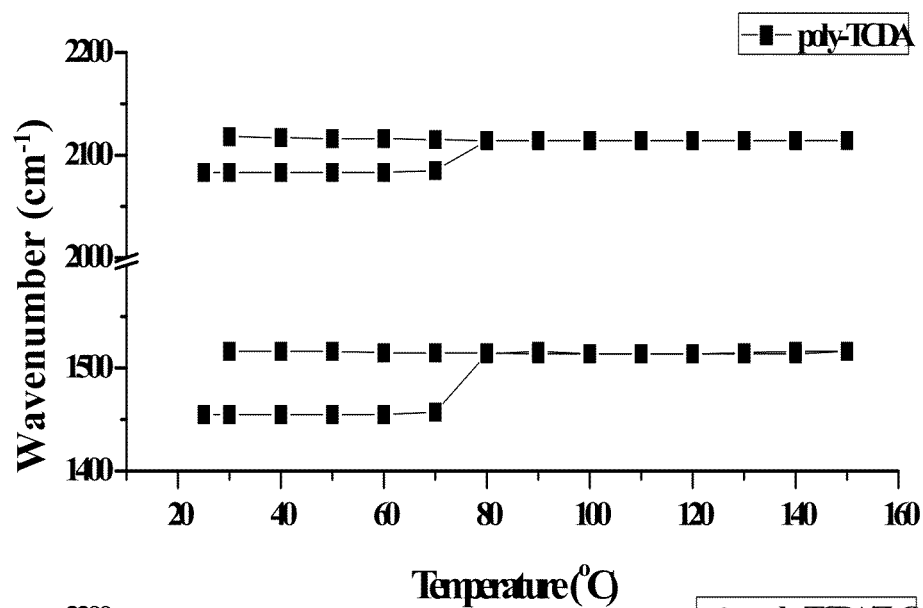
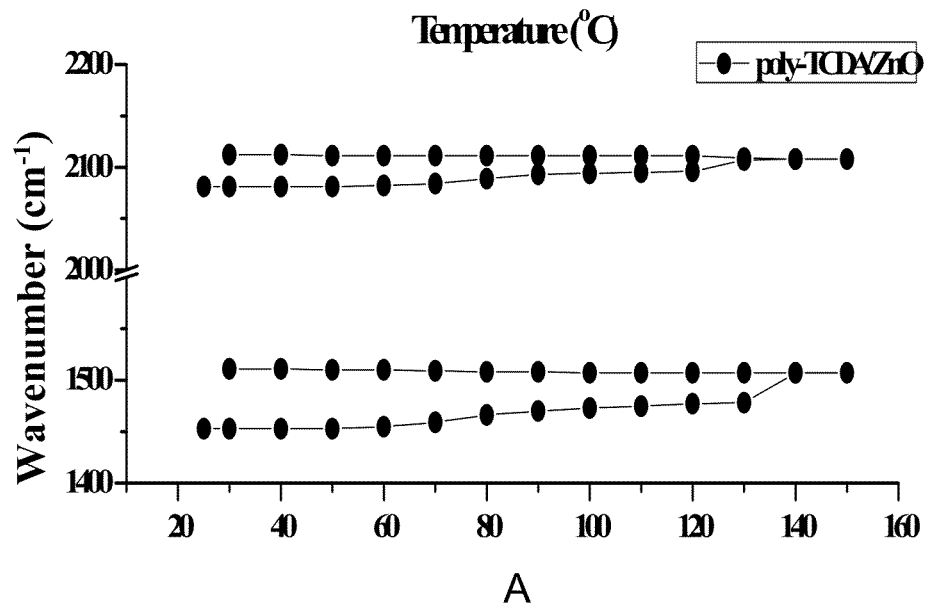
A
FIG. 16B

TCDA/ZINC OXIDE NANOCOMPOSITES AND FILM SENSORS

FIELD OF THE INVENTION

The present invention relates to the field of sensors, more specifically the area of TCDA/ZnO nanocomposite film sensors.

BACKGROUND OF THE INVENTION

Materials that change color in response to external stimuli are known as "chromic materials". Such chromic materials may radiate, lose color, or change properties induced by external stimuli. Different stimuli result in different responses in the material being affected.

Polydiacetylenes ("PDAs") are a series of conjugated polymers which can undergo thermochromic transitions when exposed to temperature stimuli. PDAs have a one-dimensional conjugated backbone with a strong $\pi$ to $\pi^*$ absorption band in the red spectral region of the optical spectrum which gives rise to an intense blue color in the polymer. The blue phase undergoes a temperature-induced or thermochromic transition observed in many PDAs to a red phase on heating. The blue to red chromatic transition is either irreversible or reversible under heating and cooling cycles depending on the chemical structure and interactions on the side chains of the PDA. In the blue phase, the strain induced by hydrogen bonding at the head groups leads to an increase in $\pi$-electron conjugation length. However, when hydrogen bonding interactions are disrupted by heat, the side group strain is released leading to twisting of the $\pi$-electron orbitals, decrease of $\pi$-electron conjugation and concomitant transition to a red phase. The red phase can rapidly reverse back to the blue phase on cooling when interactions due to: (a) strong head aromatic groups, (b) ionic moieties, and (c) covalent bond, enhanced hydrogen and multibonding bonding at the head groups are present in the PDA structures. The red phase is irreversible when the head group interactions cannot be restored on cooling. These PDAs are therefore either irreversible or reversible sensors.

Inkjet printing processes include several well-known attributes, including providing a non-contact and low cost method of fabrication, the ability to deposit precise amount of materials in a rapid way, the ability to print on specific locations which is controlled by computer, low temperature processing with no need for a vacuum and compatibility with various substrates.

SUMMARY OF THE INVENTION

Novel TCDA/ZnO compositions are disclosed in which the Zn is nanosized, having an average particle size of less than 100 nm. These novel compositions are sometimes referred to herein as "nanocomposites". Reversible thermochromatic sensors employing the TCDA/ZnO nanocomposites and methods of printing TCDA/ZnO nanocomposite thin films forming the reversible thermochromatic sensors using inkjet printing techniques are also disclosed.

In the disclosed TCDA/ZnO nanocomposite compositions TCDA may be present in an amount of 6 to 99.5 weight percent (wt %) based on the total weight of the composition. In one embodiment TCDA may be present in an amount of 20 to 99.5 weight percent (wt %) based on the total weight of the composition. In another embodiment TCDA may be present in an amount of 50 to 97.5 weight percent (wt %) based on the total weight of the composition. In yet another embodiment TCDA may be present in an amount of 85 to 97.5 weight percent (wt %) based on the total weight of the composition.

ZnO may be present in an amount of from 0.5 to 94.0 wt %. In one embodiment ZnO is present in an amount of from 0.5 to 80.0 wt %. In another embodiment ZnO is present in an amount of from 2.5 to 50.0 wt %. In another embodiment ZnO is present in an amount of from 2.5 to 15.0 wt %. In one embodiment ZnO is present in an amount of from 5.0 to 15.0 wt %. The ZnO is nanoparticle-sized having an average particle size of 0.01-99 nm, more preferably 0.1-99 nm, more preferably 0.1-15 nm.

In one embodiment, thermochromically reversible compositions including poly-10,12-tricosadiynoic acid (poly-TCDA) and 2.5 wt % or more of ZnO having a particle size range less than 100 nm are disclosed. The inventors have surprisingly found that while in pure poly-TCDA, heating above the chromatic blue to red transition temperature forms an irreversible red phase, poly-TCDA composites with nano-size ZnO display rapid chromatic reversibility.

In another embodiment, thermochromically reversible compositions are disclosed which include poly-TCDA and 2.5-15 wt % or more of ZnO having a particle size range less than 100 nm.

In another embodiment, thermochromically reversible compositions are disclosed which include poly-TCDA and 5-15 wt % or more of ZnO having a particle size range less than 100 nm.

In yet a further embodiment thermochromically reversible compositions are disclosed which consist of poly-TCDA and 2.5-15 wt % of ZnO having a particle size range less than 100 nm.

In another embodiment, thermochromically reversible compositions are disclosed which consist of poly-TCDA and 5-15 wt % or more of ZnO having a particle size range less than 100 nm.

In one embodiment novel nanocomposite inks for thin film applications disclosed herein are made by dispersing a precursor TCDA monomer in the absence of and/or in the presence of stabilizing agents utilizing aqueous and non-aqueous media as the continuous phase. The reversibility of chromatic transition may be attained by changing the ratio of TCDA to nanosized ZnO. The chromatic transition properties may be varied according to the particle size of ZnO, stabilizer type and dispersing media.

In still a further embodiment, compositions are disclosed which include a suspension of TCDA and 0.5-94 wt % of ZnO having a particle size range below 100 nm. Such suspensions may be applied to substrates using conventional inkjet printing. In a further embodiment an ink composition consists of a suspension of TCDA and 2.5-15 wt % of ZnO having a particle size range below 100 nm in chloroform.

The formulated inks may be fit for a variety of inkjet printing processes. For example, in one embodiment the formulated ink is fit for 10 picoliter inkjet printing. The disclosed TCDA/ZnO nanocomposites may fulfill completely/partially reversible color change responding to temperature stimulus. The composites may also be applied in the detection of chemical solvent.

Methods disclosed herein provide a fast method in ionic bond strengthened PDA thin film fabrication. In some embodiments the methods permit inkjet printing of a relatively high concentration TCDA-ZnO suspension without using surfactant on a flexible substrate In yet a further embodiment poly-TCDA/ZnO thin film sensors are disclosed. Thermochromically reversible film sensors may include poly-TCDA and ZnO nanoparticles disposed on a substrate wherein the ZnO nanoparticles have an average particle size of 0.01-99 nm. In one embodiment thermochromically reversible film sensors are provided which include a substrate and a film consisting of poly-TCDA and ZnO nanoparticles disposed on the substrate wherein the ZnO nanoparticles have an average particle size of 0.01-99 nm. The thermochromically reversible film sensors may consist of TCDA and 0.5-94 wt % of ZnO.

An information storage thermal sensor is provided having at least a portion thereof comprising a thermochromic composition. In one embodiment the sensor includes a QR code.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that those having ordinary skill in the art will have a better understanding of how to make and use the disclosed systems and methods, reference is made to the accompanying figures wherein:

FIGS. 6A-6D are graphical depictions of temperature dependence on heating and cooling of the polymer backbone C≡C and C═C stretching mode frequencies of poly-TCDA and poly-TCDA/ZnO composites with different ZnO contents in accordance with an embodiment of the presently disclosed subject matter;

FIGS. 16A and 16B are graphical depictions of C≡C and C═C wavenumbers of poly-TCDA and poly-TCDA-ZnO, respectively, as a function of temperature in accordance with an embodiment of the presently disclosed subject matter;

(FIG. 20B); poly-TCDA-ZnO at 25° C. after 40 cycles (FIG. 20C); poly-TCDA at 25° C. after 5 cycles (FIG. 20D) in accordance with an embodiment of the presently disclosed subject matter.

DETAILED DESCRIPTION OF THE INVENTION

Figure 1A:
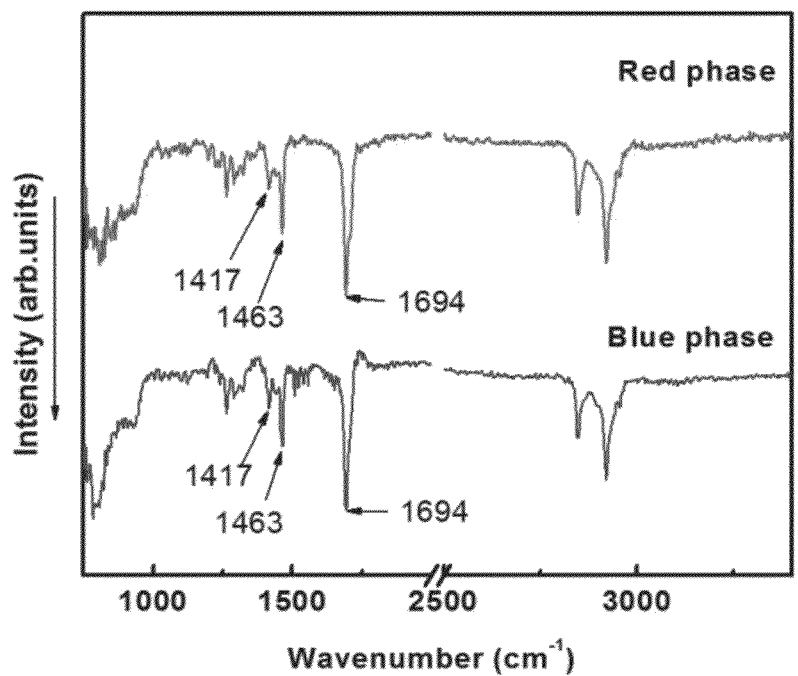
FIG. 1A is a graphical depiction of ATR-FTIR spectra at room temperature of pure poly-TCDA in the blue and red phases in accordance with an embodiment of the presently disclosed subject matter.

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

Thermochromically reversible compositions including TCDA and nanosize ZnO having a particle size range less than 100 nm are disclosed. The inventors have surprisingly found that while in pure poly-TCDA, heating above the chromatic blue to red transition temperature forms an irreversible red phase, poly-TCDA composites with nanosize ZnO display rapid chromatic reversibility. The nanosized ZnO is preferably unalloyed.

Compositions disclosed herein may be incorporated into the form of an ink, paint, spray or other type of coating for subsequent application and use. Accordingly, any conventional components required for the production of such ink, paint, etc. may be included, such as polymeric binders, plasticizers, UV absorbents, etc.

TCDA may be present in an amount of 6 to 99.5 weight percent (wt %) based on the total weight of the composition. In one embodiment TCDA may be present in an amount of 20 to 99.5 weight percent (wt %) based on the total weight of the composition. In another embodiment TCDA may be present in an amount of 50 to 97.5 weight percent (wt %) based on the total weight of the composition. In yet another embodiment TCDA may be present in an amount of 85 to 97.5 weight percent (wt %) based on the total weight of the composition.

ZnO may be present in an amount of from 0.5 to 94.0 wt %. In one embodiment ZnO is present in an amount of from 0.5 to 80.0 wt %. In another embodiment ZnO is present in an amount of from 2.5 to 50.0 wt %. In another embodiment ZnO is present in an amount of from 2.5 to 15.0 wt %. In one embodiment ZnO is present in an amount of from 5.0 to 15.0 wt %. The ZnO is nanoparticle-sized having an average particle size of 0.01-99 nm, more preferably 0.1-99 nm, more preferably 0.1-15 nm.

Syntheses of the presently disclosed TCDA and nanosized ZnO compositions were carried out on a laboratory scale. A representative process for preparation of a poly-TCDA and ZnO composition is disclosed in the experiments hereinbelow.

In one embodiment flexible reversible color change poly-TCDA-ZnO composite-based chromatic sensors are disclosed. Substrates may include any substrate that is amenable to inkjet printing, such as but not limited to paper, cloth, polymer, glass, etc.

For example, a poly-TCDA based sensor was made using a Fujifilm Dimatix printer model DMP-2800 which is based on piezoelectric inkjet technology. A cartridge with a nozzle pore size of ca. 20 μm diameter was filled with a TCDA/chloroform solution or suspension of the TCDA-ZnO in chloroform and the ink was printed on unmodified. After inkjet printing the printed images were formed following solvent evaporation at 40° C. The inkjet-printed TCDA and TCDA/ZnO composites were polymerized to the blue phase of poly-TCDA composites by irradiating with a 254 nm wavelength UV source after inkjet printing. Red phase poly-TCDA was prepared by heating up the inkjet printed pattern to chromatic transition temperature. Attenuated Total Reflection (ATR)-Fourier Transform Infrared (FTIR) results showed chelate formation between TCDA and ZnO. In one embodiment, a film sensor of poly-TCDA-ZnO (2.5 wt %) on a flexible substrate was produced with reversible chromatic transition from 25° C. to 80° C., which cannot be found in pure poly-TCDA. Temperature-dependent Raman spectra indicate the blue-red phase of poly-TCDA-ZnO (2.5 wt %) thermal-triggered color change occurs at 70° C. and amorphous phase forms at around 120° C.

An inkjet printed Quick Response (QR) code made using TCDA-ZnO ink as disclosed herein demonstrates a sensory functionality which can be incorporated into such QR codes.

The presently disclosed TCDA/ZnO nanocomposites are novel, as are their uses as chromatic sensors and production thereof using inkjet printing. The functionality of the disclosed TCDA/ZnO nanocomposites may be varied. For example, by changing ratio of TCDA to ZnO, the chromatic transition temperature may be varied.

EXAMPLES AND EXPERIMENTS

Experiment 1

Materials. TCDA was purchased from GFS Chemicals and nanocrystalline ZnO (<100 nm diameter) was purchased from Sigma-Aldrich. Analytical grade chloroform was purchased from Sigma-Aldrich and used without further purification.

Synthesis of Poly-TCDA-ZnO Nanocomposites. Poly-TCDA/ZnO suspensions were prepared by suspending different amounts of ZnO (5 wt %, 10 wt %, 15 wt %) in solution of the TCDA monomer (1 mM) in chloroform. The suspension contained in a beaker was sonicated in a water bath at room temperature for 30 min and dried at 40° C. with magnetic stirring for 8 hours. The magnetic stirring was stopped after the liposome state was achieved. The pure TCDA and TCDA composites were polymerized to the blue phase of poly-TCDA and poly-TCDA-ZnO composite by irradiating with a 254 nm wavelength UV source. Powders of the blue phase composite were obtained by scraping from the beaker and grinding into a fine powder. Red phase composite powders and films were similarly produced after heating the blue phase to above the thermochromic transition temperature.

Raman Spectroscopy. Raman spectra at room temperature were obtained primarily using a Mesophotonics Raman spectrometer with 785 nm laser excitation. Temperature-dependent Raman measurements were carried out with an EZRaman LE Raman Analyzer system from Optronics using 785 nm laser excitation coupled to a Leica optical microscope. The spectrometer was calibrated using silicon wafer and diamond powder standards to a frequency accuracy of 1 $cm^{-1}$. The variable temperature optical stage used was from Linkam Scientific Instruments Ltd. Thick films for the Raman measurements were prepared by mixing suspensions of TCDA with certain amount of ZnO, using chloroform as the suspension medium. After drying and 254 nm UV radiation, the polymerized dry powder of poly-TCDA and poly-TCDA/ZnO were measured on a silicon wafer substrate.

ATR-FTIR Spectroscopy. Fourier Transform Infrared (FTIR) was carried out using a Nicolet ThermoElectron FTIR 560 spectrometer with a MIRacle attenuated total reflectance (ATR) platform assembly and a Ge plate.

Optical Densitometry. Chromaticity, which is a quantitative measure of the vividness or dullness of a color (or how close the color is to either the gray or pure hue) was measured directly on thin film and coated samples using an X-Rite 518 optical densitometer as the samples were heated on a temperature-controlled hot plate.

Differential Scanning Calorimetery (DSC). A Mettler Toledo DSC instrument (Mettle-Toledo Inc. Columbus, Ohio, USA) with a FP90 central processor was used to obtain the DSC data of 10 mg of precursor, polymer and composite samples wrapped in a small disk with aluminum foil using heating/cooling/heating cycles in the temperature range from 25° C. to 300° C. at a rate of 10° C. $min^{-1}$.

Attenuated Total Reflection (ATR)-Fourier Transform Infrared (FTIR) spectroscopy at room temperature in both the red and blue phases for pure poly-TCDA and for the blue phase in poly-TCDA/ZnO together with Raman spectroscopy as a function of temperature for poly-TCDA and poly-TCDA/ZnO provide details about the molecular structural changes around the chromatic transition and molecular interactions on nanocomposite formation. The thermal and colorimetric changes as a function of temperature at these transitions are investigated further by DSC and optical densitometry, respectively.

Figure 1B:
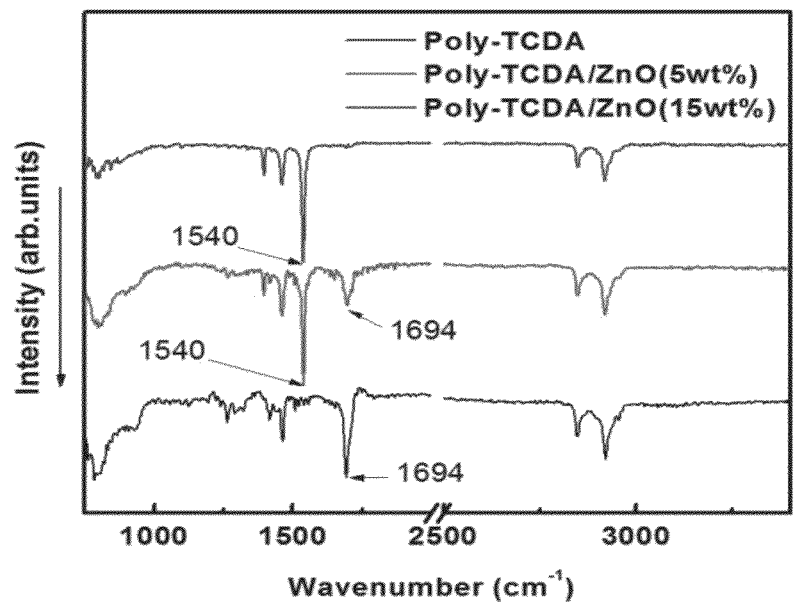
FIG. 1B is a graphical depiction of ATR-FTIR spectra at room temperature of poly-TCDA and poly-TCDA/ZnO in the blue phase for two concentrations of ZnO between 700 and 3300 cm-1 in accordance with an embodiment of the presently disclosed subject matter.
Figure 1C:
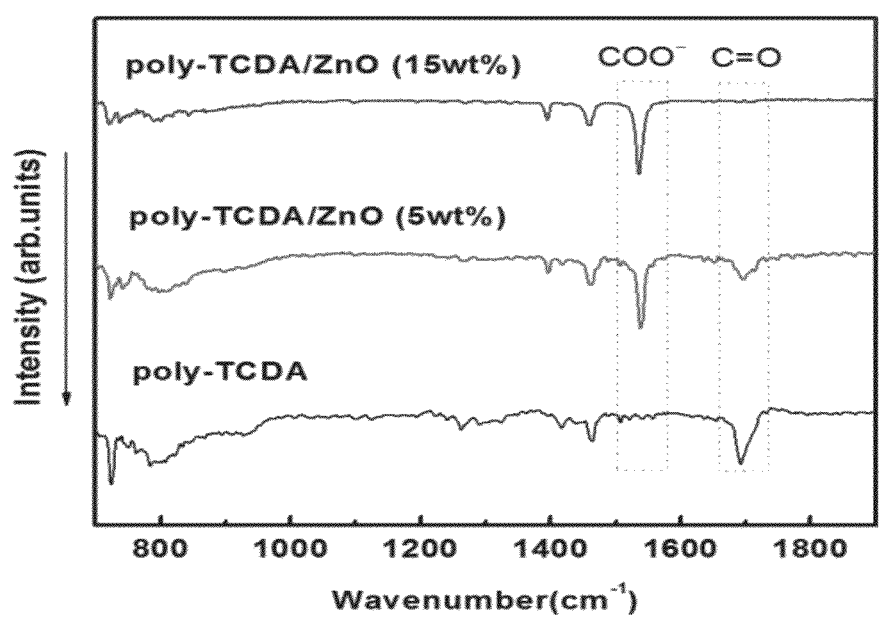
FIG. 1C is a graphical depiction of ATR-FTIR spectra according to FIG. 1B expanded in the 750 and 1800 cm-1 spectral range, respectively.

FIG. 1A shows the ATR-FTIR spectra of poly-TCDA in its blue and red phases, and FIGS. 1B and 1C show the spectra of poly-TCDA and poly-TCDA/ZnO in the 700 to 3500 $cm^{-1}$ and expanded in the 700 to 1900 $cm^{-1}$ regions, respectively. Lines at 2920 and 2847 $cm^{-1}$ are assigned to the asymmetric and symmetric stretching vibrations, respectively, of the $CH_2$ groups on the side chains, and those at 1463, 1417 and 1694 $cm^{-1}$ can be attributed to the $CH_2$ scissoring and hydrogen-bonded carbonyl C=O stretching vibrations, respectively. On comparing the FTIR spectra of pure poly-TCDA with that of poly-TCDA/ZnO shown in FIGS. 1B and 1C, it was observed that a relatively strong new line appears at 1540 $cm^{-1}$ in the spectrum of poly-TCDA/ZnO together with a concomitant decrease in intensity of the C=O stretching line at 1694 $cm^{-1}$. The 1540 $cm^{-1}$ line can be assigned to an asymmetric $COO^-$ stretching vibration and its presence in the spectra together with a corresponding decrease in the intensity of the C=O line suggests that a chelate between neighboring side chain —COOH head groups of poly-TCDA and $Zn^{2+}$ ions from ZnO is formed. This chemical interaction between ZnO and poly-TCDA, dependent on the ionicity of the Zn—O bond is likely to cause the high temperature red phase to revert to the blue phase on cooling in poly-TCDA/ZnO composites.

Figure 2A:
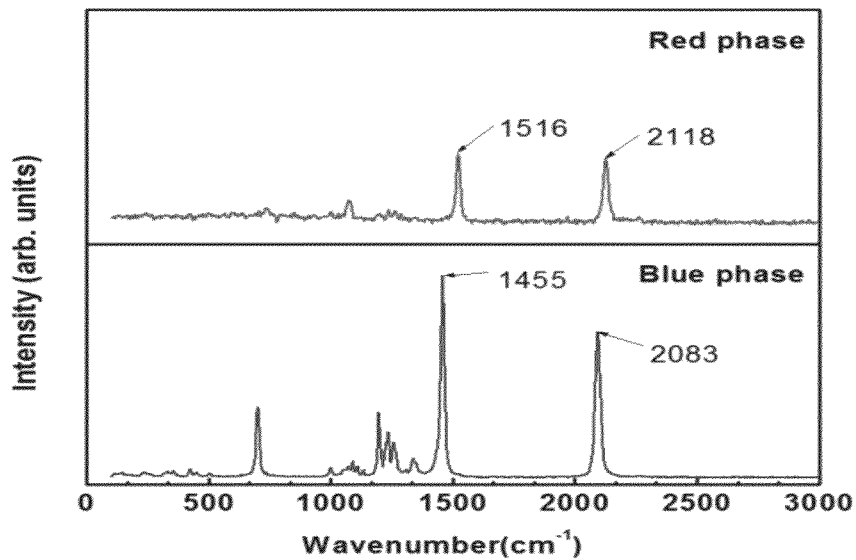
FIG. 2A is a graphical depiction 785 nm laser-excited Raman spectra of blue (bottom) and red (top) phases of poly-TCDA at room temperature in accordance with an embodiment of the presently disclosed subject matter.

Raman scattering due to the molecular vibrational modes of the conjugated polymer backbone are expected to be primarily resonance-enhanced for excitation using 780 nm laser radiation. From the Raman spectra in FIG. 2A for pure poly-TCDA, two intense lines at 2083 $cm^{-1}$ and 1455 $cm^{-1}$ were observed at room temperature in the blue phase, which can be definitively assigned to the C≡C and C=C stretching modes of the polymer backbone, respectively. The C=C stretching mode is close in frequency to a line at 1463 $cm^{-1}$ assigned to a side chain $CH_2$ deformation mode observed in the ATR-FTIR spectra in FIG. 1. In the red phase the room temperature C≡C and C=C stretching vibration frequencies at 2114 $cm^{-1}$ and 1516 $cm^{-1}$, respectively, increase due to the irreversible stress on the polymer backbone due to dissociation of the head group hydrogen bonds in the red phase. The line intensities in the red phase are lower because of decreased resonance interaction with the polymer backbone. This decrease in resonance interaction with the polymer backbone in the red phase was not evident in the Raman spectrum of the red phase of PCDA and is likely to be due to the fact that the hydrocarbon side chain is longer in PCDA. The Raman lines at frequencies below that of the C=C stretching mode can be assigned to Raman-active deformation and C—C stretching motions of the conjugated polymer backbone mixed with hydrocarbon chain deformation modes. The triplet of lines around 1250 $cm^{-1}$ and the line at 690 $cm^{-1}$ in the blue phase are relatively intense as a result of resonance enhancement due to mixing of the backbone C—C stretching and deformation modes.

Figure 2B:
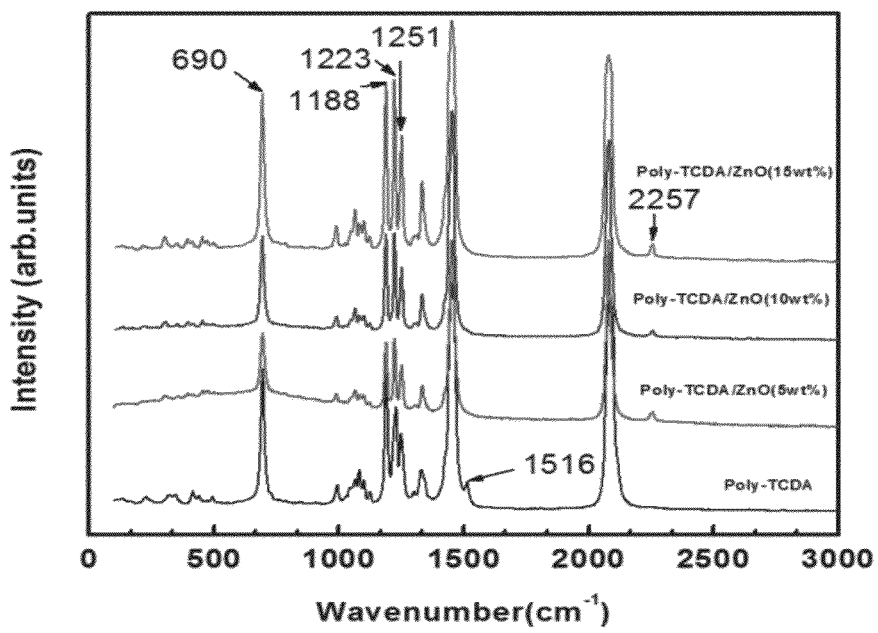
FIG. 2B is a graphical depiction of blue phase of poly-TCDA and poly-TCDA/ZnO composites with three different ZnO concentrations at ambient temperature in accordance with an embodiment of the presently disclosed subject matter.

FIG. 2B shows the Raman spectrum of pure poly-TCDA in the blue phase compared with the blue phase spectra of poly-TCDA/ZnO composites. Now referring to FIGS. 3A and 3B, it is evident that a very weak line at 2257 $cm^{-1}$ in the C≡C stretching mode region of poly-TCDA increases in intensity in the composite. By contrast a relatively weak line in the C=C region at 1516 $cm^{-1}$ in the blue phase due to a red phase impurity disappears on composite formation. The line at 2257 $cm^{-1}$ can be assigned to a diyne defect formed on the backbone due to the chemical interaction between TCDA and ZnO. However, the intensity of this line appears to saturate at low ZnO concentration and does not increase with increasing ZnO. Another feature in FIGS. 3A and 3B which is consistent with the chemical interaction of poly-TCDA with ZnO is that the line at 690 $cm^{-1}$ and the triplet of lines at 1250 $cm^{-1}$ assigned above to largely polymer backbone modes show substantial increase in intensity in the composite phase.

Figure 3A:
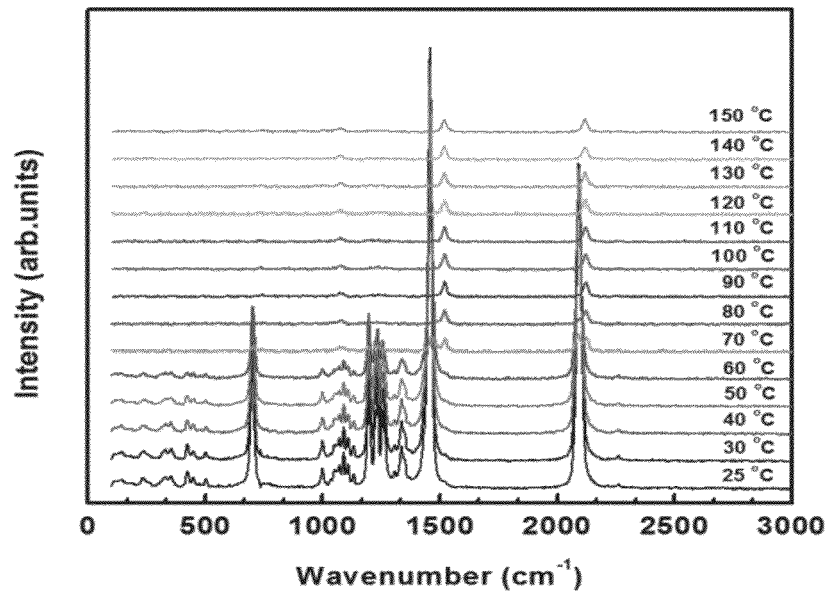
FIGS. 3A and 3B are graphical depictions of 785 nm laser excited Raman spectra of pure poly-TCDA as a function of increasing temperature (FIG. 3A) and decreasing temperature (FIG. 3B) in accordance with an embodiment of the presently disclosed subject matter.
Figure 3B:
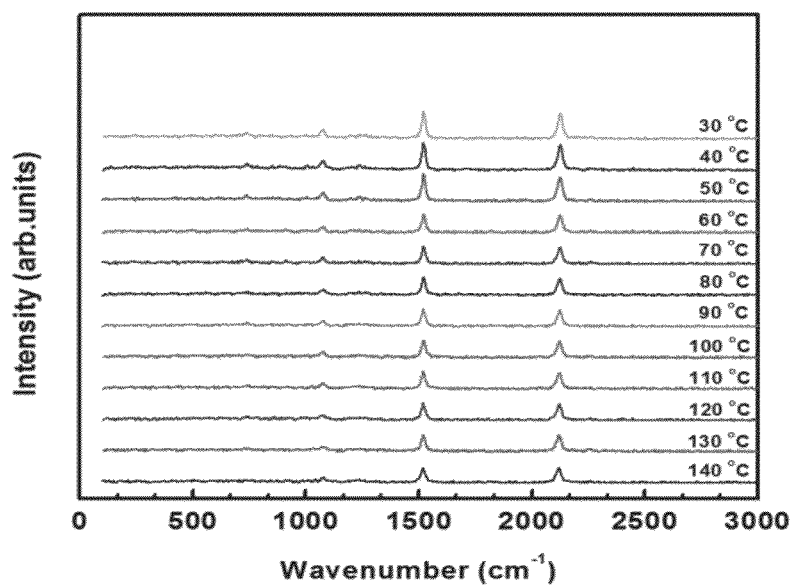

With reference to FIGS. 3A-5B, Raman spectra under heating and cooling cycles in the 25° C. to 150° C. temperature range for poly-TCDA and poly-TCDA/ZnO at different ZnO concentrations are shown. The Raman data were taken in steps of 10° C. from 30° C. to 150° C. and also recorded in 10° C. steps during the cool down to room temperature. FIGS. 3A-3B display the Raman spectra of poly-TCDA with increasing temperature to 150° C. (FIG. 3A) followed by cooling from 140° C. to 30° C. (FIG. 3B). The heat-up spectra in FIG. 3A indicate the backbone stretching and deformation lines in the blue phase decrease in intensity with increasing temperature as the sample goes to the red phase consistent with the fact that resonance-enhancement is weaker in the red phase as discussed above. The weak line at 1516 $cm^{-1}$ assigned to a red phase impurity in the blue phase grows in intensity and becomes the predominant C=C backbone stretching mode in the red phase. FIG. 3B shows the spectrum remains essentially unchanged on cooling consistent with the irreversibility of the red phase of poly-TCDA.

Figure 4A:
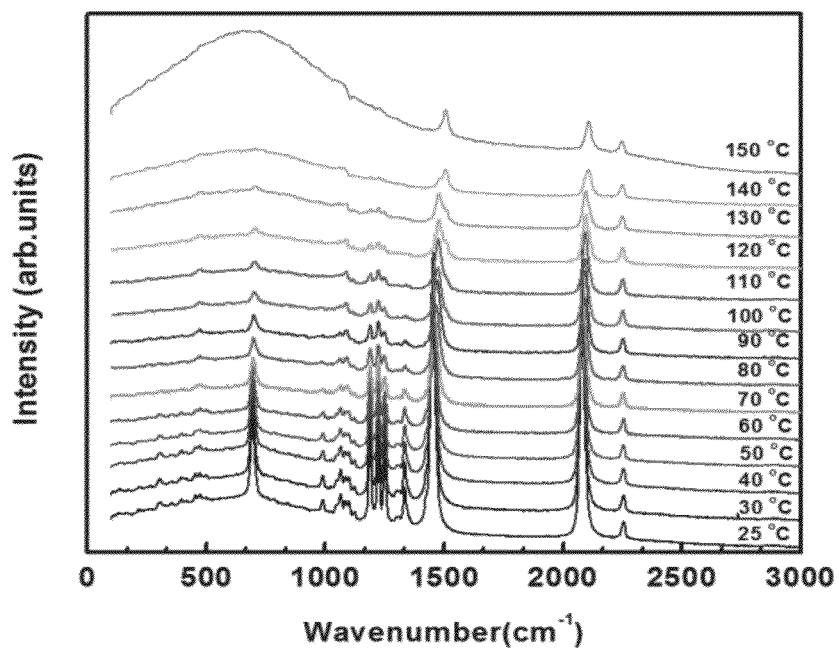
FIGS. 4A and 4B are graphical depictions of 785 nm laser excited Raman spectra of poly-TCDA/ZnO (5 wt %) as a function of increasing temperature (FIG. 4A) and decreasing temperature (FIG. 4B) in accordance with an embodiment of the presently disclosed subject matter.
Figure 4B:
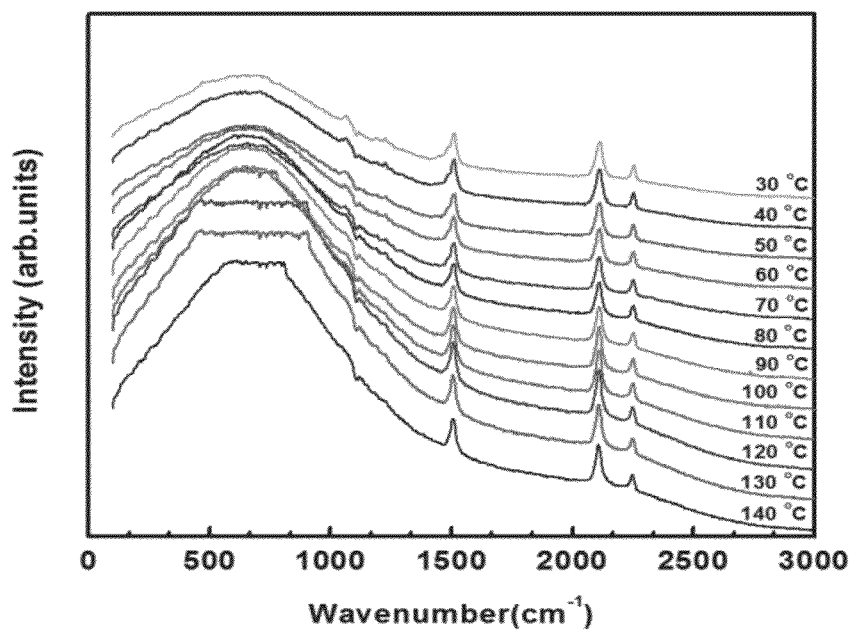

The heating and cooling Raman spectra of poly-TCDA/ZnO with the ZnO content at 5 wt % are shown in FIGS. 4A and 4B, respectively. By contrast with the variable temperature spectra for pure poly-TCDA, a broad scattering band centered near 690 $cm^{-1}$ appears reproducibly in the spectra with increasing intensity as the temperature approaches and goes above the ca. 120° C. melting transition of the ZnO composites observed in the DSC data discussed hereinbelow and shown in FIGS. 7A-D. Note that the broad scattering feature appears below the melting transition temperature and increases in intensity above 120° C. Without being confined to a single theory it is believed this is due to light scattering from an amorphous network of the poly-TCDA/ZnO complex. The scattering is not seen at higher ZnO concentrations as discussed below and it is also not observed in poly-PCDA/ZnO at all concentrations of ZnO, most likely because the diffusional motions of the longer hydrocarbon side chain in poly-PCDA compared with poly-TCDA prevents the formation of the amorphous network. The intensity from the amorphous network shows a small decrease on cooling through the melting temperature down to room temperature in FIG. 4B. Moreover, the features of the spectra in FIG. 4B show that the red phase of the composite with 5% by weight of ZnO converts only partially back to the blue phase on cooling.

Figure 5A:
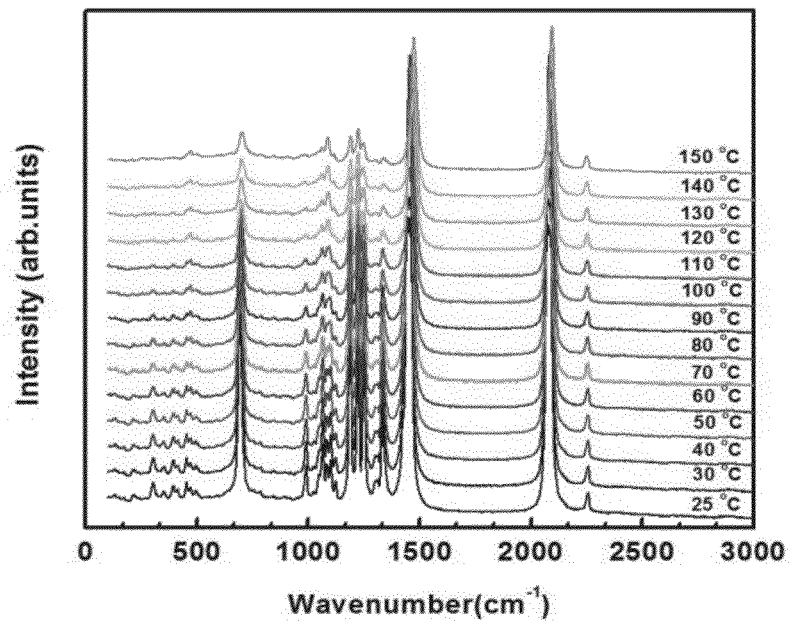
FIGS. 5A and 5B are graphical depictions of 785 nm laser excited Raman spectra of poly-TCDA/ZnO (15 wt %) as a function of increasing temperature (FIG. 5A) and decreasing temperature (FIG. 5B) in accordance with an embodiment of the presently disclosed subject matter.
Figure 5B:
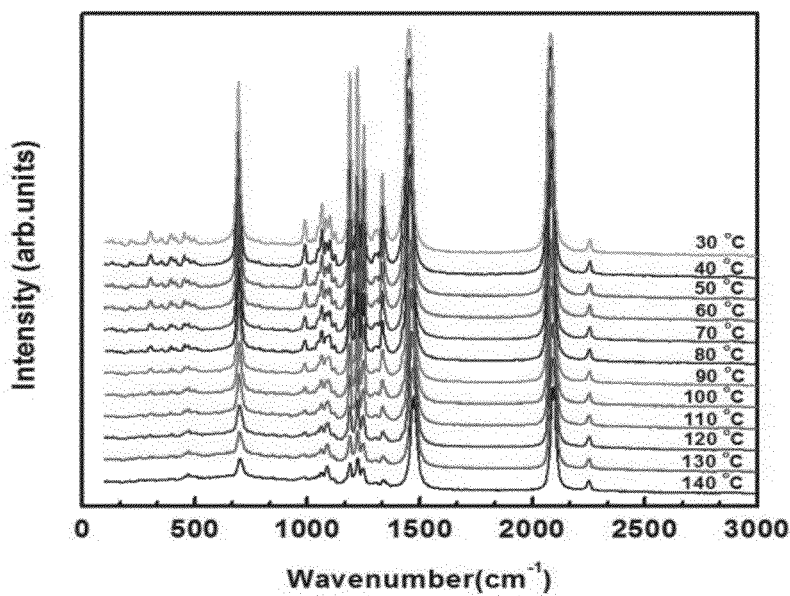

FIGS. 5A and 5B show the heating and cooling Raman spectra, respectively, of poly-TCDA/ZnO (15 wt %). Similar heating and cooling Raman spectra (not shown) were observed for poly-TCDA/ZnO (10 wt %). Broad scattering due to amorphous poly-TCDA/ZnO at these higher ZnO concentrations are not observed. Also, the red phase spectrum changes rapidly back to that of the blue phase on cooling.

The Raman frequencies of the C=C and C≡C backbone stretching vibrations of pure poly-TCDA, poly-TCDA with 5 wt %, 10 wt % and 15 wt % of ZnO below 100 nm in size as a function of heating and cooling cycles are plotted as a function of temperature in FIGS. 6A-6D. The frequency upshift in the red phase decreases with increasing ZnO content suggesting that the stress on the polymer backbone is lowered due to chelation of ZnO with the head group of poly-TCDA to make the chromatic transition reversible. The plots in FIGS. 6A-6D of the Raman-active C=C and C≡C backbone stretching frequencies as a function of temperature cycling indicate increases in frequencies at the chromatic blue to red transition at 70° C. on heating for pure poly-TCDA and near 120° C. for the poly-TCDA/ZnO composites. For poly-TCDA/ZnO (5 wt %), the slight upshift of frequency of the C=C and C≡C modes at 70° C. may be due to non-chelated TCDA monomer. The frequency upshift at 130° C. in the composites is due to chelate formation between TCDA and ZnO.

Figures 7A, 7B, 7C, 7D:
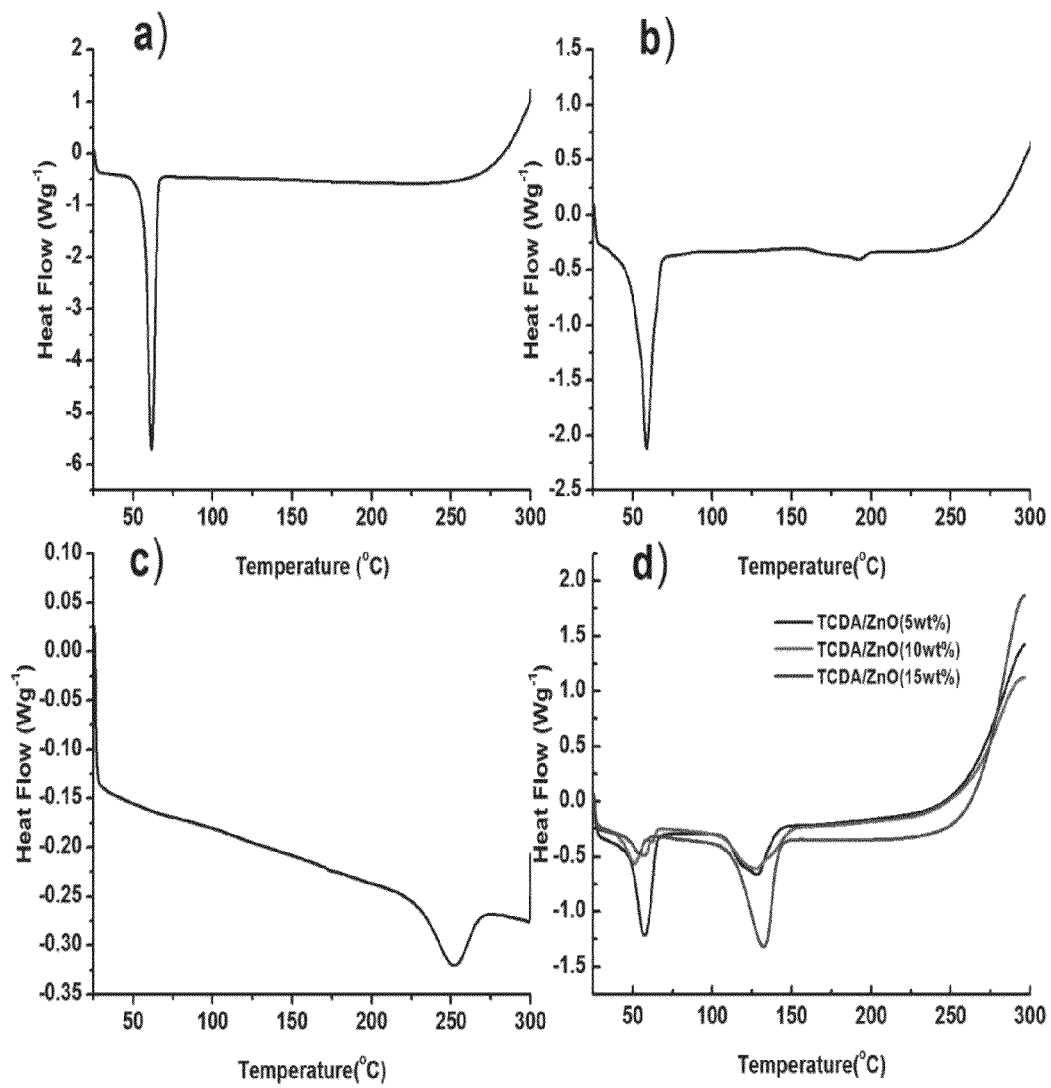
FIGS. 7A-7D are graphical depictions of heating DSC scans for a TCDA monomer (FIG. 7A); poly-TCDA (FIG. 7B—the slightly broadened transition is due to unpolymerized monomer); ZnO nanopowder (<100 nm)(FIG. 7C); and TCDA monomer/ZnO nanocomposites (FIG. 7D) of three different compositions in accordance with an embodiment of the presently disclosed subject matter.

Now referring to FIGS. 7A-7D, differential scanning calorimetry (DSC) measurements provide further understanding of the nature of TCDA/poly-TCDA/ZnO interactions. DSC data were obtained for pure TCDA monomer, poly-TCDA, and poly-TCDA/ZnO, at heating and cooling rates of 10° C. min$^{-1}$ between 25° C. and 300° C. The heating scan for pure TCDA in FIG. 7A shows an endothermic peak at 61° C. due to melting. On cooling (scan not shown here) down-shifted exothermic crystallization peaks at 59° C. due to hysteresis were observed. The heating scan for poly-TCDA in FIG. 7B shows an endothermic peak at 61° C. due to melting of the unpolymerized monomer. A broad endotherm with a shoulder at 154° C. and a peak at 190° C. are assigned to the melting of poly-TCDA. On cooling (scan not shown), polymer crystallization is indicated by broad exothermic features at 159° C. and 194° C. which are upshifted due to hysteresis relative to the corresponding endothermic melting peaks. Crystallization of unpolymerized monomer was not observed during the cooling cycle probably due to loss of the monomer by sublimation during thermal cycling. The heating scans for TCDA-ZnO nanocomposites in FIG. 7D show endotherm around 57° C. due to unpolymerized monomer and a new endothermic feature at around 137° C. due to melting of the monomer modified by chelate formation with ZnO discussed above. It is also seen from FIG. 7D that with the increase of ZnO content, the endotherm due to TCDA becomes weaker and the peak shifts to higher temperature indicating that the chelate between ZnO and head group —COOH becomes stronger because more chelate formation can occur with increasing ZnO content. This is consistent with the FTIR, Raman and DSC data discussed above suggesting an interaction of ZnO particles with the head group of the polymer side-chain to form a chelate which can be schematically written as: $Zn^{2+}(COO^-)_2$. In pure poly-TCDA, heating causes an irreversible stress on the polymer backbone due to the dissociation of hydrogen bonds between the side chain head groups to form the red phase. In the presence of ZnO, chelate formation results in release of strain on cooling and reversal to the blue phase.

Figure 8A:
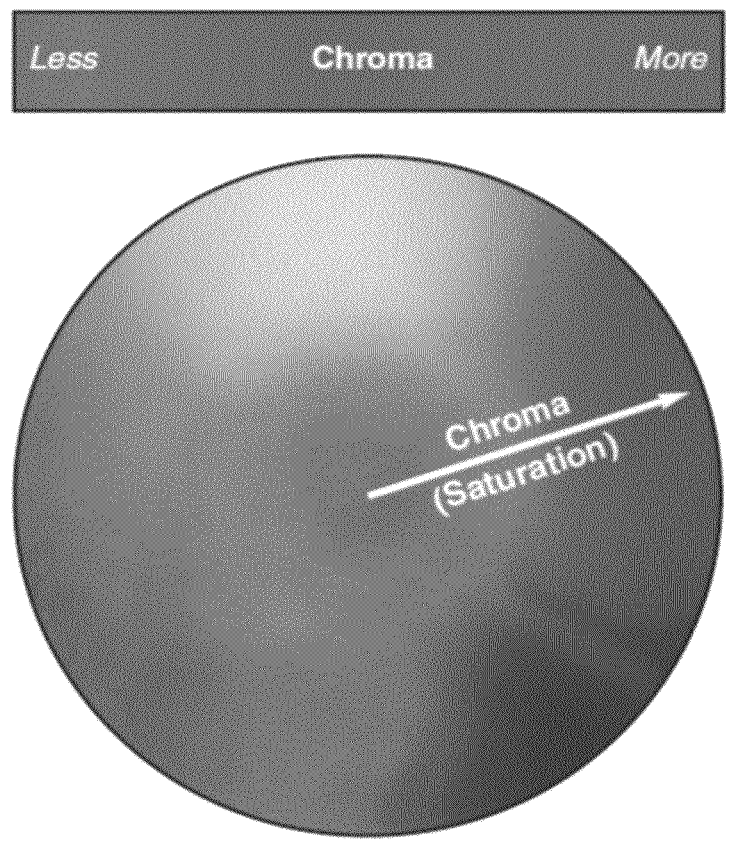
FIG. 8A is a schematic depiction of chromaticity (chroma) distribution from gray (dull) color at the center to saturated (vivid) color at the perimeter (arrows indicate chromatic transition temperatures discussed in the text)
Figure 8B:
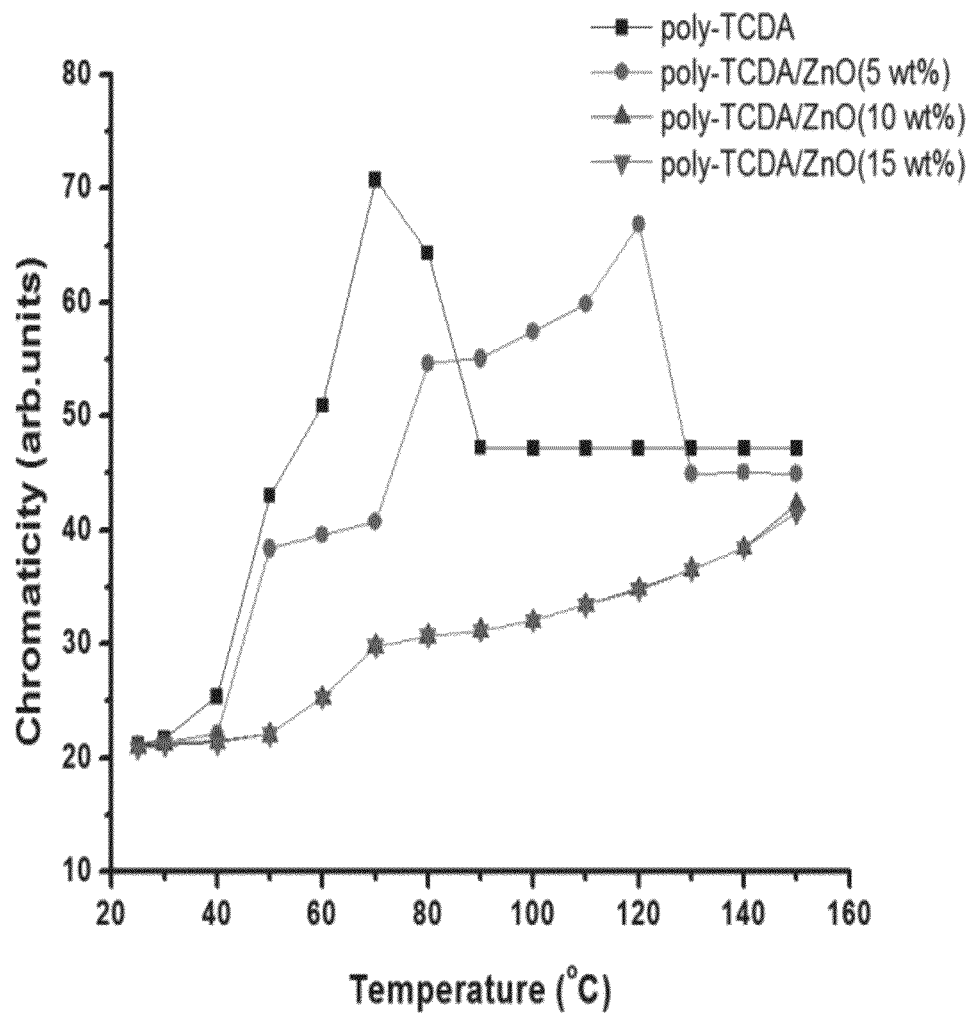
FIG. 8B is a graphical depiction of chromaticity versus temperature for poly-TCDA and poly-TCDA/ZnO composites of three different compositions in accordance with an embodiment of the presently disclosed subject matter.
Figure 8C:
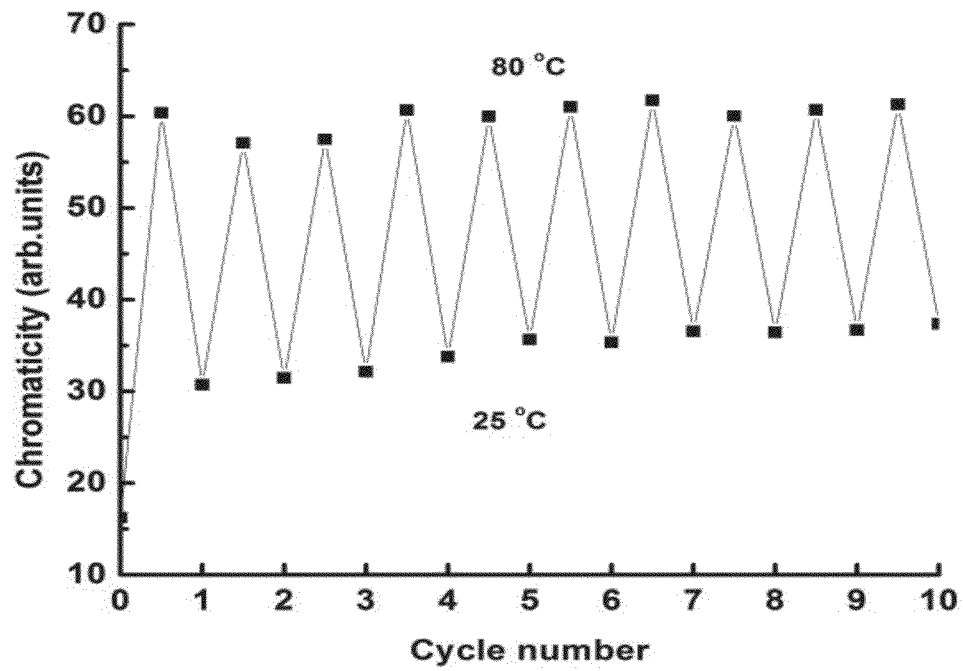
FIG. 8C is a graphical depiction of chromaticity of poly-TCDA/ZnO (5 wt %) as a function of thermal cycle in accordance with an embodiment of the presently disclosed subject matter.
Figure 8D:
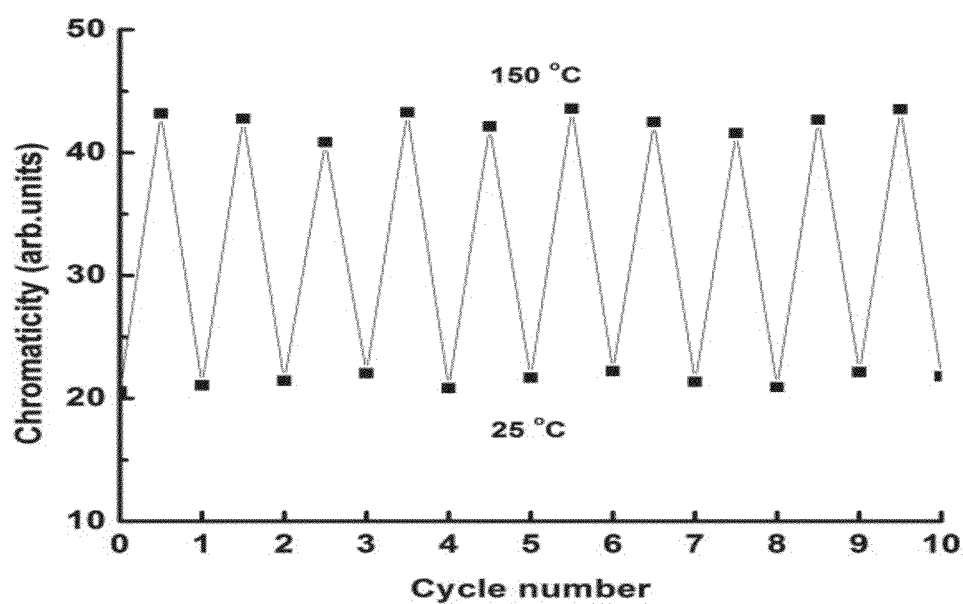
FIG. 8D is a graphical depiction of chromaticity of poly-TCDA/ZnO (15 wt %) as a function of thermal cycle in accordance with an embodiment of the presently disclosed subject matter.

The changes in chromaticity for different samples shown in FIG. 8B as a function of temperature further verifies the interaction between poly-TCDA and ZnO with increase of ZnO content from 5 wt % to 15 wt %. The rapid increase followed by a drop of the chromaticity of poly-TCDA is caused by the chromatic transition near 70° C. 5 wt % ZnO increases the chromatic transition to 120° C. consistent with the Raman data. The poly-TCDA/ZnO composites with 10 wt % and 15 wt % have almost the same correlation of chromaticity and temperature which indicates that there is a critical ZnO content to form the chelate between TCDA and ZnO. FIGS. 8C and 8D show fairly good reversibility in chromaticity as a function of number of cycles from 25° C. to 80° C. and from 25° C. to 150° C. indicating that the nanocomposite can function as a very reproducible thermal sensor.

Thus, Raman, FTIR, DSC and colorimetric measurements confirm the thermochromic reversibility introduced by composite formation of poly-TCDA with ZnO in the particle size range below 100 nm. Raman frequency upshifts occur at 70° C. and 120° C. in pure poly-TCDA and poly-TCDA/ZnO composites, respectively, corresponding to chromatic transitions. The peak shifts of the Raman-active υ(C=C) and υ(C≡C) vibration peaks increase with increase of ZnO content. Poly-TCDA/5 wt % ZnO shows only partially reversible color change, whereas poly-TCDA/10 wt % ZnO and poly-TCDA/15 wt % ZnO change color reversibly and have similar thermochromic responses. The Raman data indicate the irreversible formation of an amorphous poly-TCDA phase in poly-TCDA/5 wt % ZnO but not in poly-TCDA composites with 10 wt % and 15 wt % ZnO. Chelate formation between ZnO and neighboring side chain —COOH head groups leads to reversibility of the chromatic transition and increase of the chromatic transition temperature. Excellent reversibility in chromaticity as a function of number of cycles from 25° C. to 80° C. and from 25° C. to 150° C. is observed indicating that the poly-TCDA/ZnO nanocomposites may function as a temperature sensor.

Experiment 2

Materials. TCDA was purchased from GFS Chemicals and nanocrystalline ZnO (<100 nm diameter) was purchased from Sigma-Aldrich. Analytical grade chloroform (>99%) was purchased from Sigma-Aldrich and used without further purification.

Preparation of TCDA/TCDA composite inks. TCDA was purified by dissolving and removing the polymerized solid. TCDA composite inks were prepared by suspending 5 wt % ZnO in TCDA/chloroform solution with the ratio of TCDA/chloroform 0.1 mol/50 ml. The suspension was sonicated in a water bath at room temperature for 15 minutes, then rested for 1 hour to enable removal of unsuspended ZnO particles (2.5 wt % of the TCDA).

Design and fabrication of poly-TCDA based chromatic sensor. The design and fabrication of the poly-TCDA based sensor was performed using a Fujifilm Dimatix printer model DMP-2800 which is based on piezoelectric inkjet technology. The cartridge with a nozzle pore size of ca. 20 μm diameter was filled with a TCDA/chloroform solution or suspension of the TCDA-ZnO in chloroform and the ink was printed on unmodified A4-sized paper. Both TCDA and TCDA/ZnO were inkjet printed with 20 volt applied on nozzle pores. Nozzle cleaning was carried out every 5 bands of printing. After inkjet printing either TCDA or TCDA/ZnO composite suspension on a flexible substrate, the printed images were formed following solvent evaporation at 40° C. The pattern for Raman and optical densitometry measurements was designed in a square shape (5 mm×5 mm).

Figure 9A:
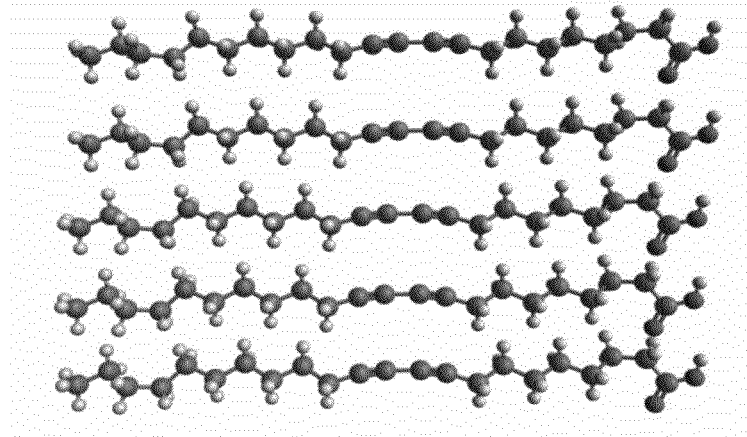
FIG. 9A and FIG. 9B are graphical depictions of polymerization of TCDA: TCDA (FIG. 9A) and poly-TCDA after UV radiation (FIG. 9B) in accordance with an embodiment of the presently disclosed subject matter.
Figure 9B:
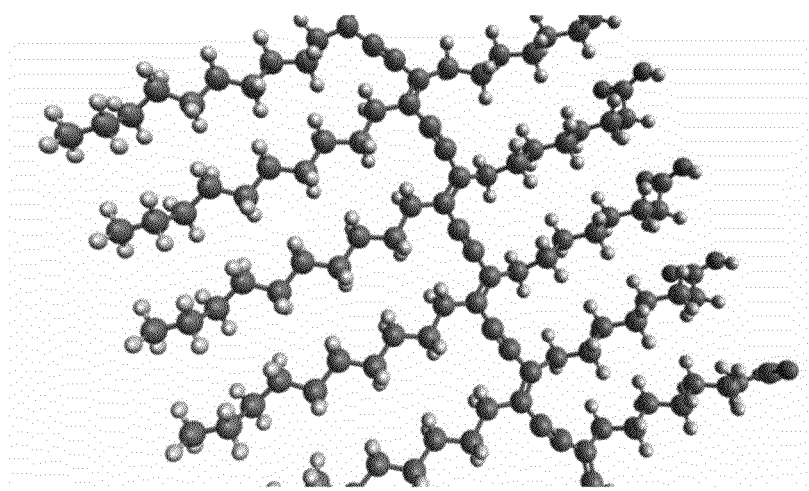

Synthesis of poly-TCDA-ZnO nanocomposites. The TCDA and TCDA/ZnO composites inkjet printed on a substrate were polymerized to the blue phase of poly-TCDA composites by irradiating with a 254 nm wavelength UV source after inkjet printing. FIGS. 9A and 9B illustrate the polymerization reaction of TCDA under UV exposure. Red phase poly-TCDA was prepared by heating up the inkjet printed pattern to chromatic transition temperature.

Material Characterization

Raman spectroscopy. Room temperature Raman spectra of thin films fabricated by inkjet printing were obtained primarily by using a Mesophotonics Raman spectrometer with 785 nm laser excitation. Temperature-dependent Raman measurements for the inkjet printed patterns were carried out with an EZRaman LE Raman Analyzer system from Optronics using 785 nm laser excitation coupled to a Leica optical microscope. The spectrometer was calibrated using silicon wafer and diamond powder standards to a frequency accuracy of 1 $cm^{-1}$. The variable temperature optical stage used was from Linkam Scientific Instruments Ltd. Thin films for the Raman measurements were prepared by 5-layer inkjet printing the suspensions of TCDA/ZnO in chloroform on silicon wafer. After 254 nm uv-radiation, the polymerized TCDA and poly-TCDA-ZnO were measured directly.

ATR-FTIR spectroscopy. Fourier Transform Infrared (FTIR) was carried out using a Nicolet ThermoElectron FTIR 560 spectrometer with a MIRacle attenuated total reflectance (ATR) platform assembly and a Ge plate. Poly-TCDA powder was acquired by scratching off the inkjet printed poly-TCDA/composites on Kapton film. The inkjet printing parameters were the same as that of paper substrate inkjet printing.

Optical densitometry. Chromaticity was measured directly on printed film using an X-Rite 518 optical densitometer as the film was heated on a temperature-controlled hot plate.

Differential scanning calorimetery (DSC). A Mettler Toledo DSC instrument with a FP90 central processor was used to obtain the DSC data of inkjet printed precursor, polymer and composites. 10 mg of powder wrapped in a small disk with aluminum foil was subjected to heating/cooling/heating cycles in the temperature range from 25° C. to 300° C. at a rate of 10° C. $min^{-1}$.

As noted above, ZnO can form chelate with neighboring side chain —COOH head groups of poly-TCDA which results in reversible chromatic transition and an increase of the chromatic transition temperature. The present inventors have further found inkjet printing processes do not change the functionality of the disclosed poly-TCDA and poly-TCDA/ZnO films.

Figure 10A:
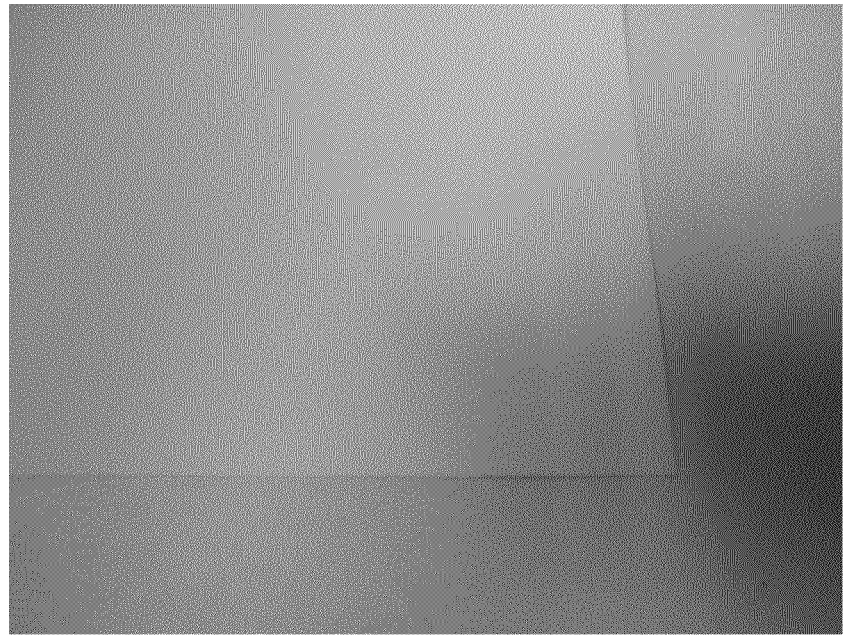
FIG. 10A and FIG. 10B are photographic depictions of photos of inkjet printed TCDA monomer before UV radiation (FIG. 10A) and after UV radiation (FIG. 10B) in accordance with an embodiment of the presently disclosed subject matter.
Figure 10B:
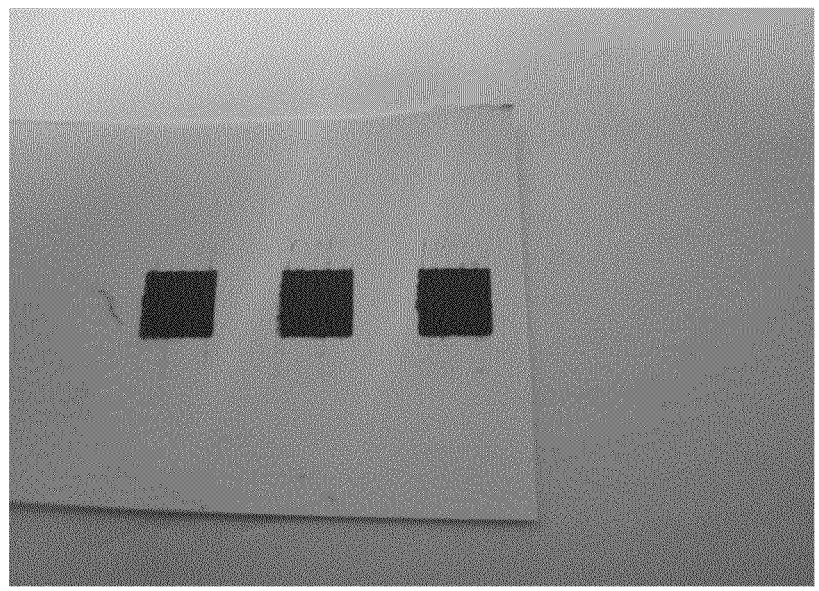

Inkjet printing TCDA and TCDA/ZnO composites. Now referring to FIG. 10A, TCDA ink applied to a substrate using an inkjet printer as described according to the present disclosures is not visible when it is in the monomer state because TCDA do not absorb visible light. However, upon polymerization with UV radiation (254 nm, 1 mW/cm 2, 30 s) blue image patterns are formed (FIG. 10B). This indicates PDA monomers are well-aligned and closely packed following printing and that PDAs are indeed generated on the paper. This is an important result since if the closely packed alignment of the PDA monomers were disrupted during the printing and fixing steps, polymerization would not proceed.

Figure 11A:
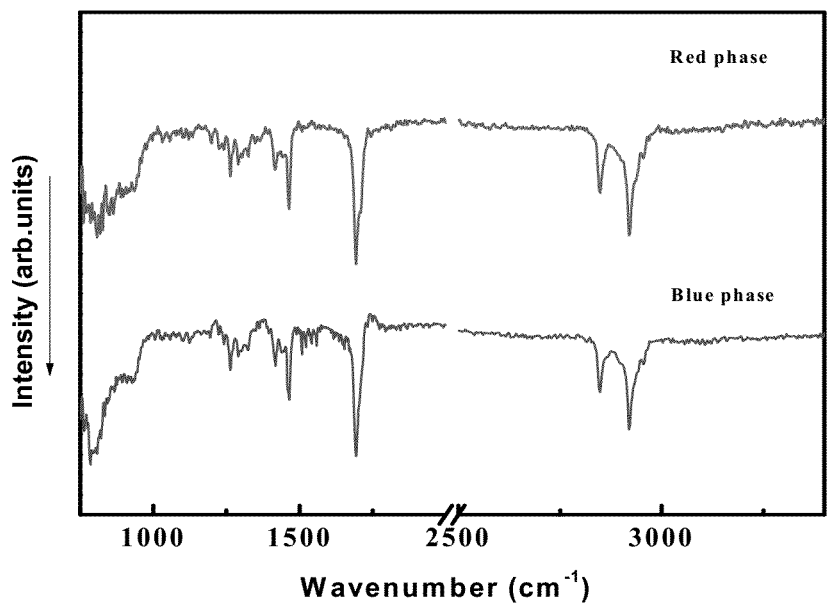
FIGS. 11A-11C are graphical depictions of ATR-FTIR spectra at room temperature of Pure poly-TCDA in the blue and red phases (FIG. 11A); poly-TCDA and poly-TCDA-ZnO in the blue phase between 700 and 3300 $cm^{-1}$ (FIG. 11B) and expanded in the 750 and 1800 $cm^{-1}$ spectral range (FIG. 11C) in accordance with an embodiment of the presently disclosed subject matter.
Figure 11B:
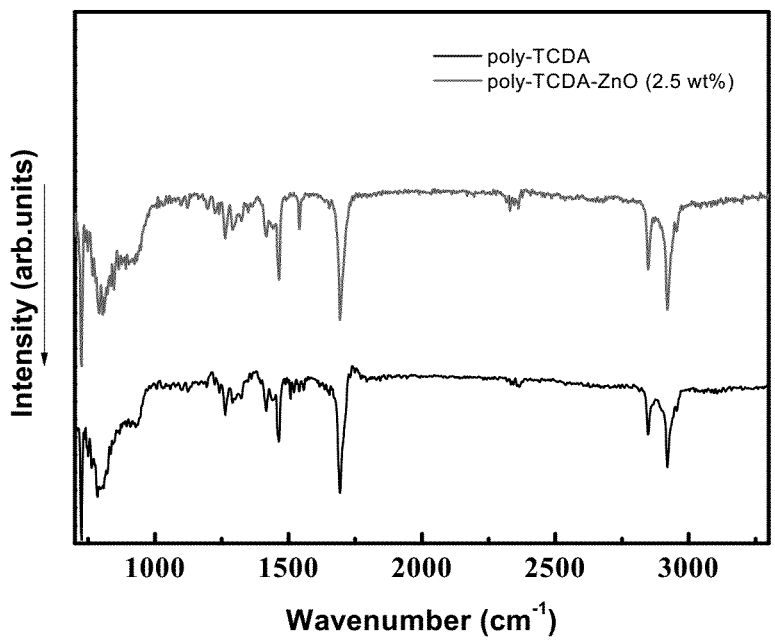
Figure 11C:
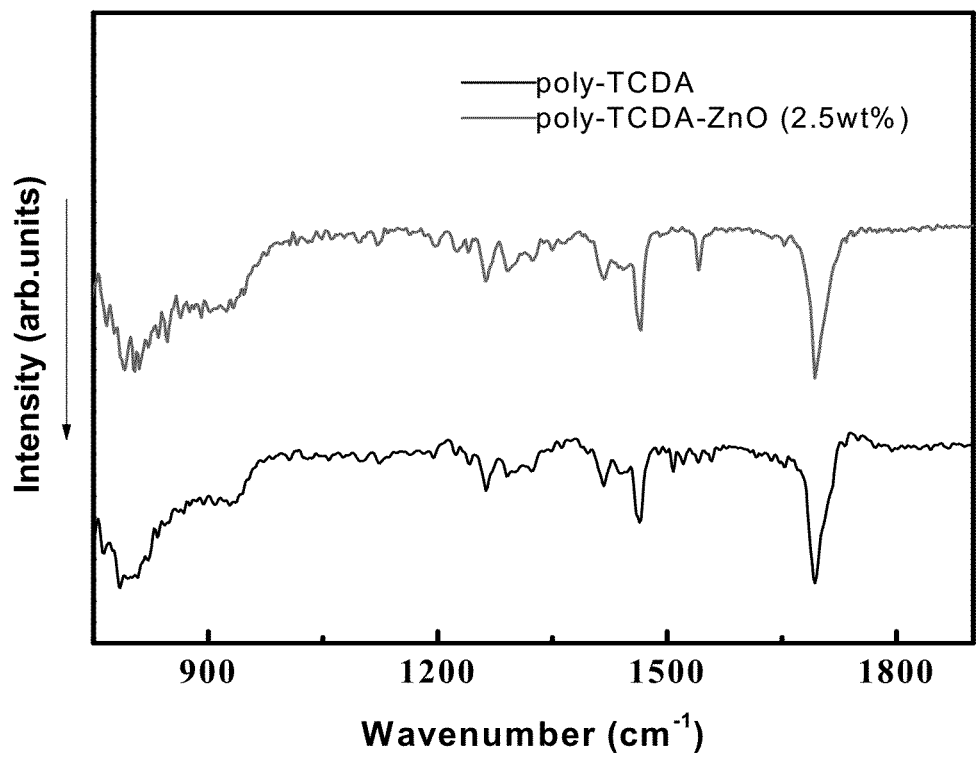

Raman and ATR-FTIR Spectroscopy of Poly-TCDA and Composites. The molecular structural changes of the chromatic transition and molecular interactions on nanocomposites formation are studied by ATR-FTIR and Raman spectroscopy at room temperature in both the red and blue phases for pure poly-TCDA and for the blue phase in poly-TCDA/ZnO. Now referring to FIG. 11A, ATR-FTIR spectra of poly-TCDA is shown in the blue and red phases. With further reference to FIGS. 11B and 11C, spectra are depicted of poly-TCDA and poly-TCDA-ZnO in the frequency region from 700 to 3300 $cm^{-1}$ and the expanded spectra from 700 to 1900 $cm^{-1}$ frequency regions, respectively. As in the first experiment, lines at 2920 and 2847 $cm^{-1}$ were assigned to the asymmetric and symmetric stretching vibrations, respectively, of the $CH_2$ groups of the hydrocarbon side chains on poly-TCDA, and those at 1463, 1417 and 1694 $cm^{-1}$ attributed to the $CH_2$ scissoring and hydrogen-bonded carbonyl C=O stretching vibrations, respectively. On comparing the FTIR spectra of pure poly-TCDA with that of poly-TCDA/ZnO shown in FIGS. 11B and 11C, a relatively strong line appears at 1540 $cm^{-1}$ in the spectrum of poly-TCDA-ZnO together with a decrease in intensity of the C=O stretching line at 1694 $cm^{-1}$. The 1540 $cm^{-1}$ line can be assigned to an asymmetric $COO^-$ vibration and its presence in the spectra indicates the formation of a chelate between the side chain —COOH head groups of poly-TCDA and $Zn^{2+}$ from ZnO.

Figure 12:
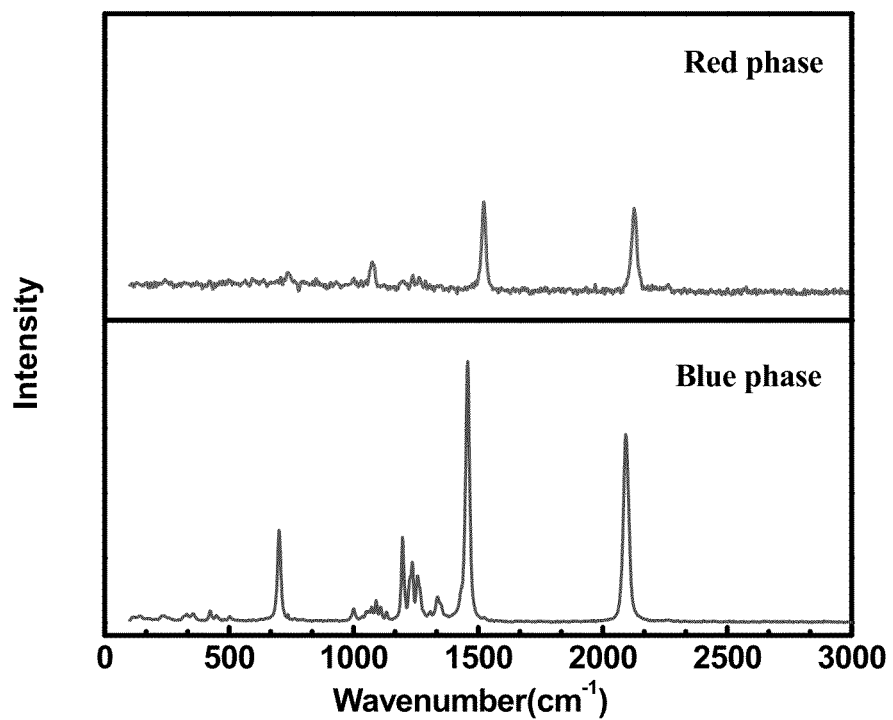
FIG. 12 is a graphical depiction of 785 nm laser-excited Raman spectra of the inkjet printed blue (bottom) and red (top) phases of poly-TCDA at room temperature) in accordance with an embodiment of the presently disclosed subject matter.

780 nm laser excited Raman spectra were obtained to probe the resonance-enhanced molecular vibrational modes of the conjugated polymer backbone. From the Raman spectra in FIG. 12 and Table 1 for pure poly-TCDA, two primary lines at 2083 $cm^{-1}$ and 1455 $cm^{-1}$ are observed at room temperature in the blue phase, which can be clearly assigned to the C≡C and C=C stretching modes of the polymer backbone, respectively. In the red phase at 25° C., the C≡C and C=C stretching vibration frequencies show up at 2114 $cm^{-1}$ and 1516 $cm^{-1}$, respectively. Compared with those in blue phase, the upshift in frequency is due to the irreversible stress on the polymer backbone caused by the breakup of the head group hydrogen bonds in the red phase.

TABLE 1

C≡C and C=C Raman peak frequencies in pure poly-TCDA and in poly-TCDA-ZnO nanocomposites in the blue and red phases.

| | Poly-TCDA, 25° C. | | Poly-TCDA/ZnO (2.5 wt %) [Blue, 25° C.; Red, 150° C.] | |
|---|---|---|---|---|
| Phase | $\upsilon(C≡C)\ cm^{-1}$ | $\upsilon(C=C)\ cm^{-1}$ | $\upsilon(C≡C)\ cm^{-1}$ | $\upsilon(C=C)\ cm^{-1}$ |
| Blue | 2083 | 1455 | 2081 | 1453 |
| Red | 2118 | 1516 | 2108 | 1507 |

Figure 13:
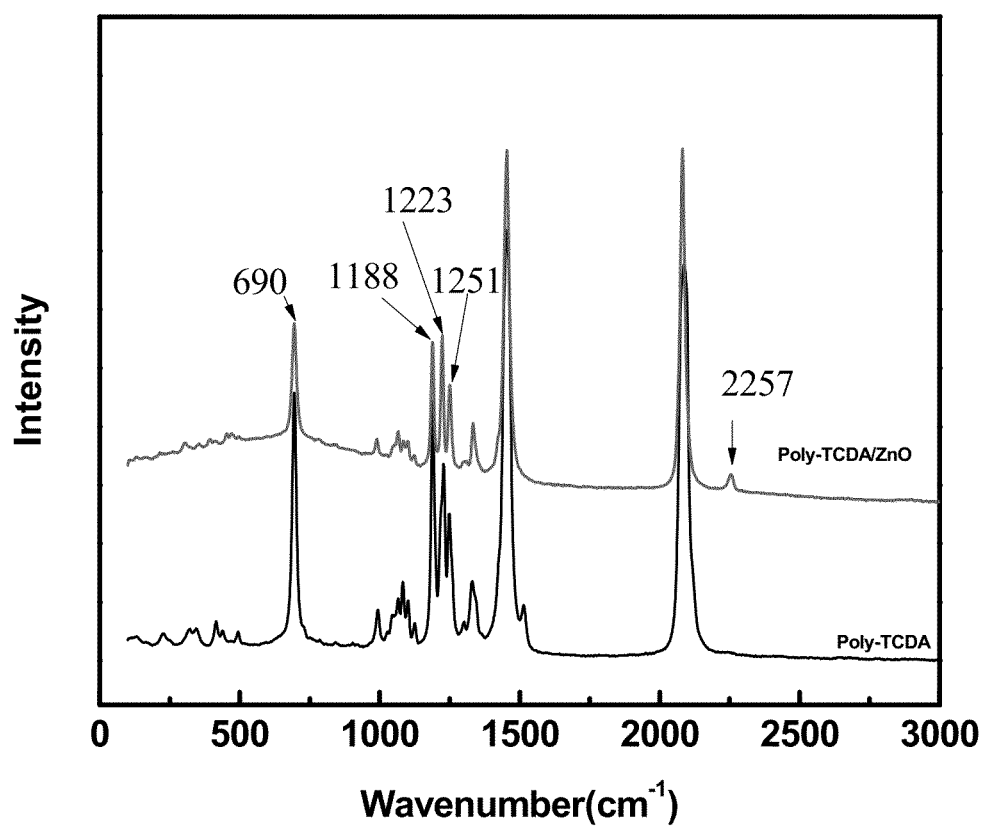
FIG. 13 is a graphical depiction of Raman spectra of pure poly-TCDA and poly-TCDA-ZnO thin film fabricated by inkjet printing in accordance with an embodiment of the presently disclosed subject matter.
Figure 14A:
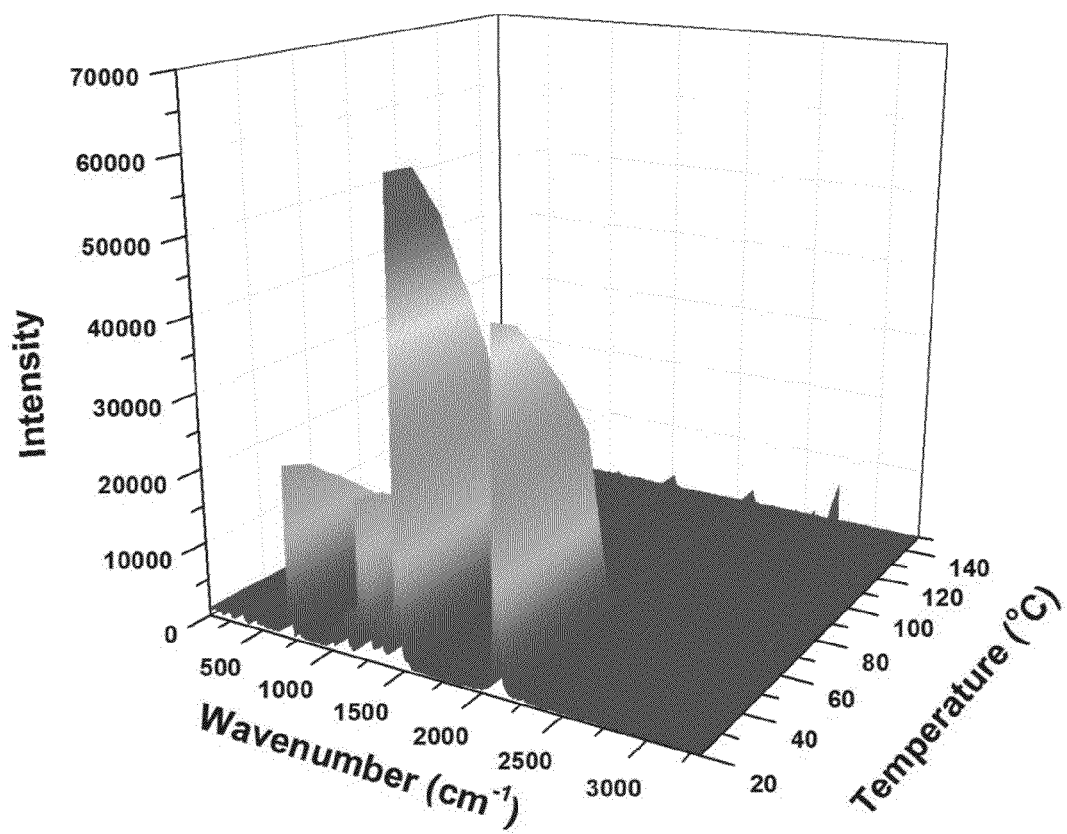
FIGS. 14A and 14B are graphical depictions of 785 nm laser excited Raman spectra of pure poly-TCDA as a function of increasing temperature (FIG. 14A) and decreasing temperature (FIG. 14B) in accordance with an embodiment of the presently disclosed subject matter.
Figure 14B:
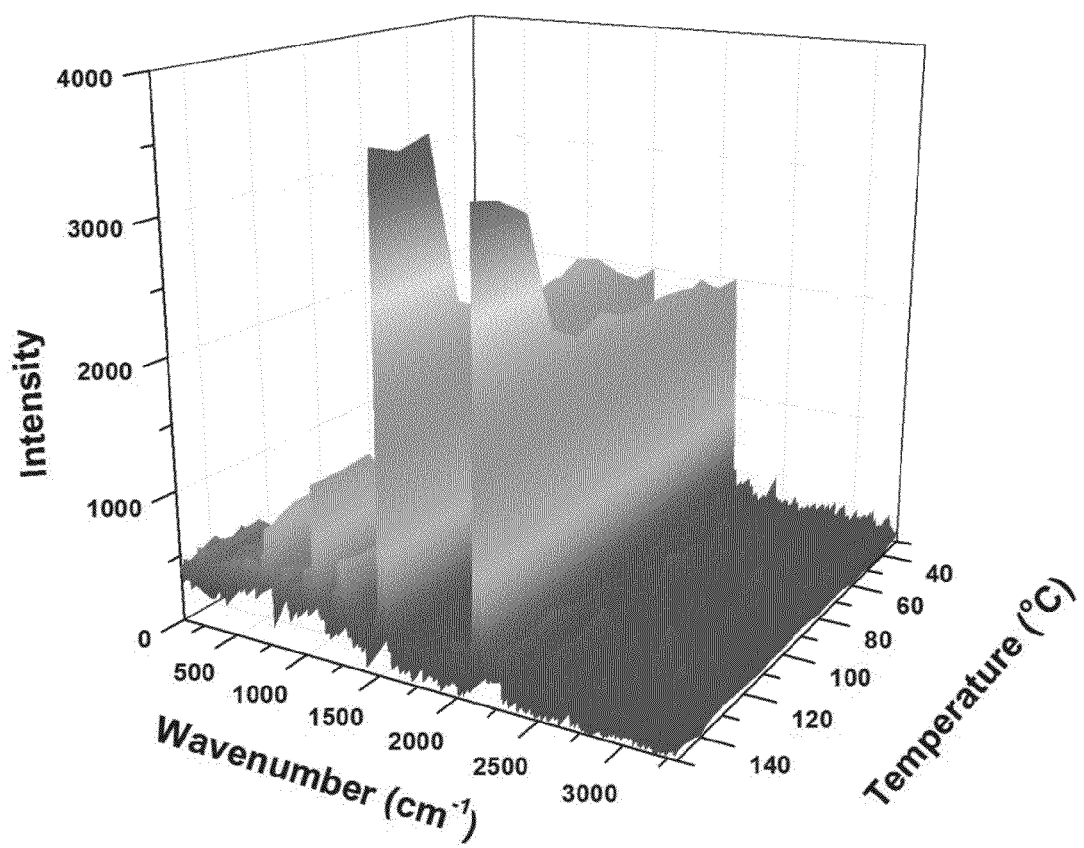

Now referring to FIG. Raman spectrum of pure poly-TCDA in the blue phase is compared with the blue phase spectra of poly-TCDA-ZnO composites prepared by the presently disclosed inkjet printing method. A very weak line at 2257 cm$^{-1}$ in the C≡C stretching mode region of poly-TCDA shows up in the Raman spectra of poly-TCDA/ZnO, which can be assigned to a diyne formed as a defect on the backbone due to the interaction between TCDA and ZnO. Similar to the poly-TCDA prepared above, the line at 1516 cm$^{-1}$ shows up in the pure poly-TCDA fabricated by inkjet printing which could be attributed to the presence of a red phase impurity in the majority blue phase. Another feature in FIG. 13 which is similar to the previous experiment is that the line at 690 cm$^{-1}$ and the triplet of lines at 1250 cm$^{-1}$ assigned above to polymer backbone modes, show substantial decrease in intensity with composite formation, meanwhile a bump shows up around line at 690 cm$^{-1}$. These phenomena could be due to the increase of disorder degree in long molecular range caused by the formation of chelate between ZnO and partial C=O groups and the disordered molecular arrangement reduces resonance interaction with the polymer backbone. By comparison with poly-TCDA in Table 1, the Raman frequency upshift of the C≡C and C=C backbone stretching vibrations in red phases decreases in the presence of ZnO, which suggests that the backbone stress is lowered due to the interaction of ZnO with poly-TCDA.

Analysis of ATR-FTIR and Raman spectra further shows that inkjet printing does not affect the close packing alignment of TCDA molecules and demonstrates the feasibility of polymerization after TCDA is inkjet printed on a paper substrate. The ATR-FTIR and Raman spectra indicate the interaction between TCDA and ZnO. Compared with poly-TCDA and poly-TCDA/ZnO (5 wt %) powders prepared in Experiment 1, no apparent difference was observed.

Figure 15A:
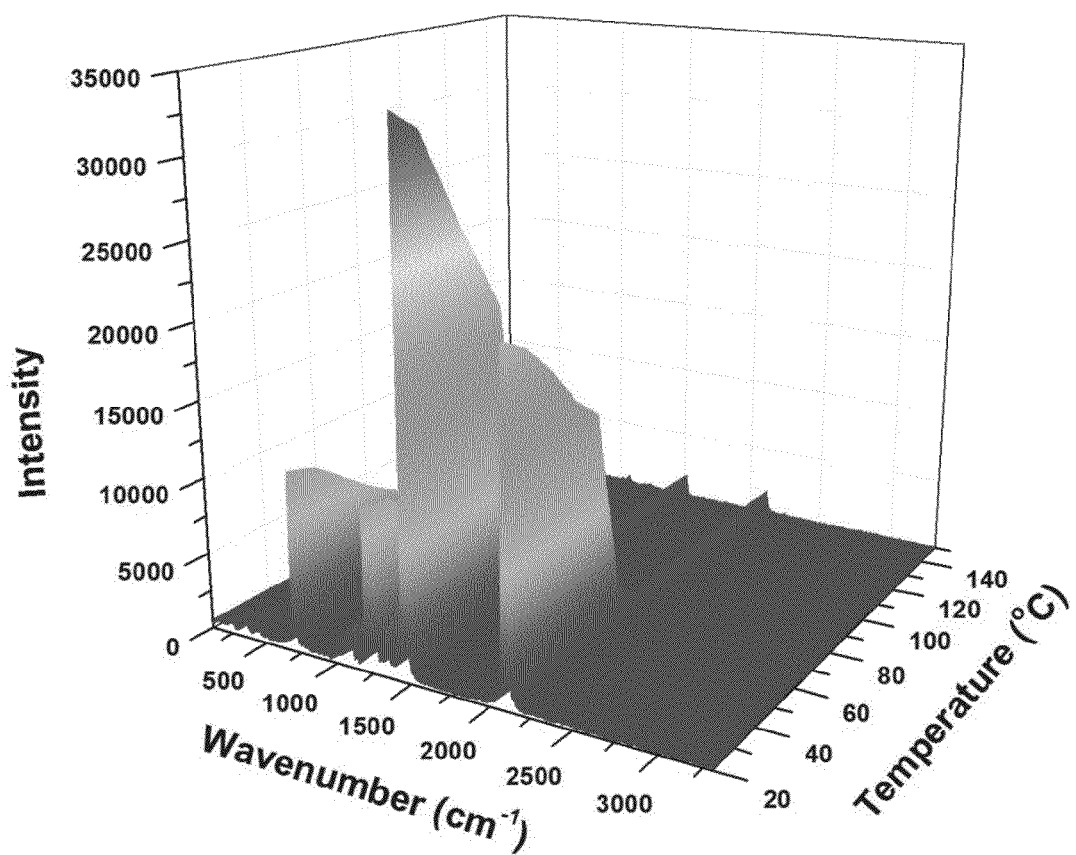
FIGS. 15A and 15B are graphical depictions of 785 nm laser excited Raman spectra of poly-TCDA-ZnO (2.5 wt %) as a function of increasing temperature (FIG. 15A) and decreasing temperature (FIG. 15B) in accordance with an embodiment of the presently disclosed subject matter.
Figure 15B:
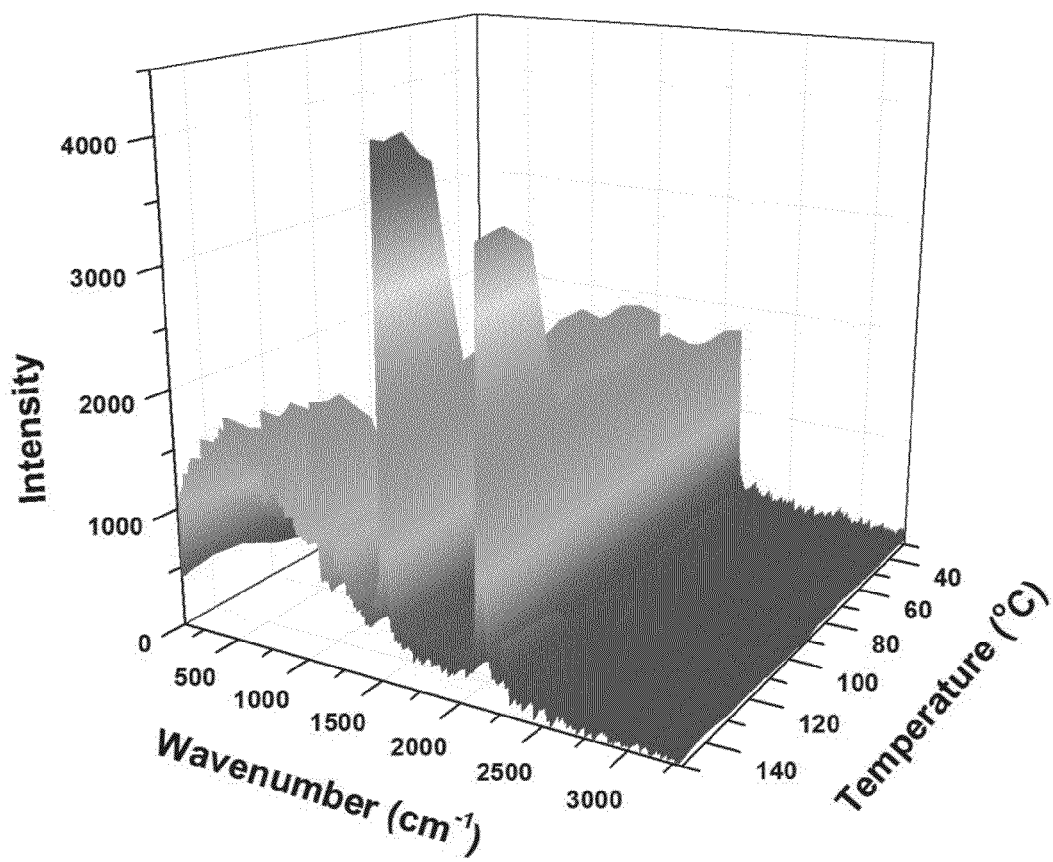

Temperature dependent Raman spectroscopy of poly-TCDA and poly-TCDA/ZnO composites. Temperature dependent Raman spectroscopy was used to further investigate the thermochromism of poly-TCDA and/or poly-TCDA composites. With reference to FIGS. 14A-14B and 15A-15B, Raman spectra under heating and cooling cycles in the 25° C. to 150° C. temperature range for poly-TCDA and poly-TCDA-ZnO are shown. The Raman data were taken in steps of 10° C. from 30° C. to 150° C. and also recorded in 10° C. steps during the cool down to room temperature. With reference to FIGS. 15A and 15B, which depict the variable temperature Raman spectra of poly-TCDA-ZnO (2.5 wt %), in contrast to the variable temperature spectra for pure poly-TCDA (FIGS. 14A-14B), a broad scattering band at 690 cm$^{-1}$ appears in the spectra with increasing intensity as the temperature is raised to form the red phase. Together with the ATI-FTIR results, it is believed this may be due to the partial C=O of TCDA forms COO$^{-1}$ with ZnO, and the amount of ionic characterized bond is not enough to maintain the backbone structure of poly-TCDA under thermal stress applied. The irreversible property caused by lack of enough ionic bond is solidified by the fact that the variable temperature Raman spectra show the same intensity and no obvious wavenumber shifting for C≡C and C=C modes on cooling which is coincident with the poly-TCDA/ZnO (5 wt %) of Experiment 1. The wavenumber of C≡C, C=C as a function of temperature is shown in FIGS. 16A-16B.

Figures 17A, 17B, 17C, 17D:
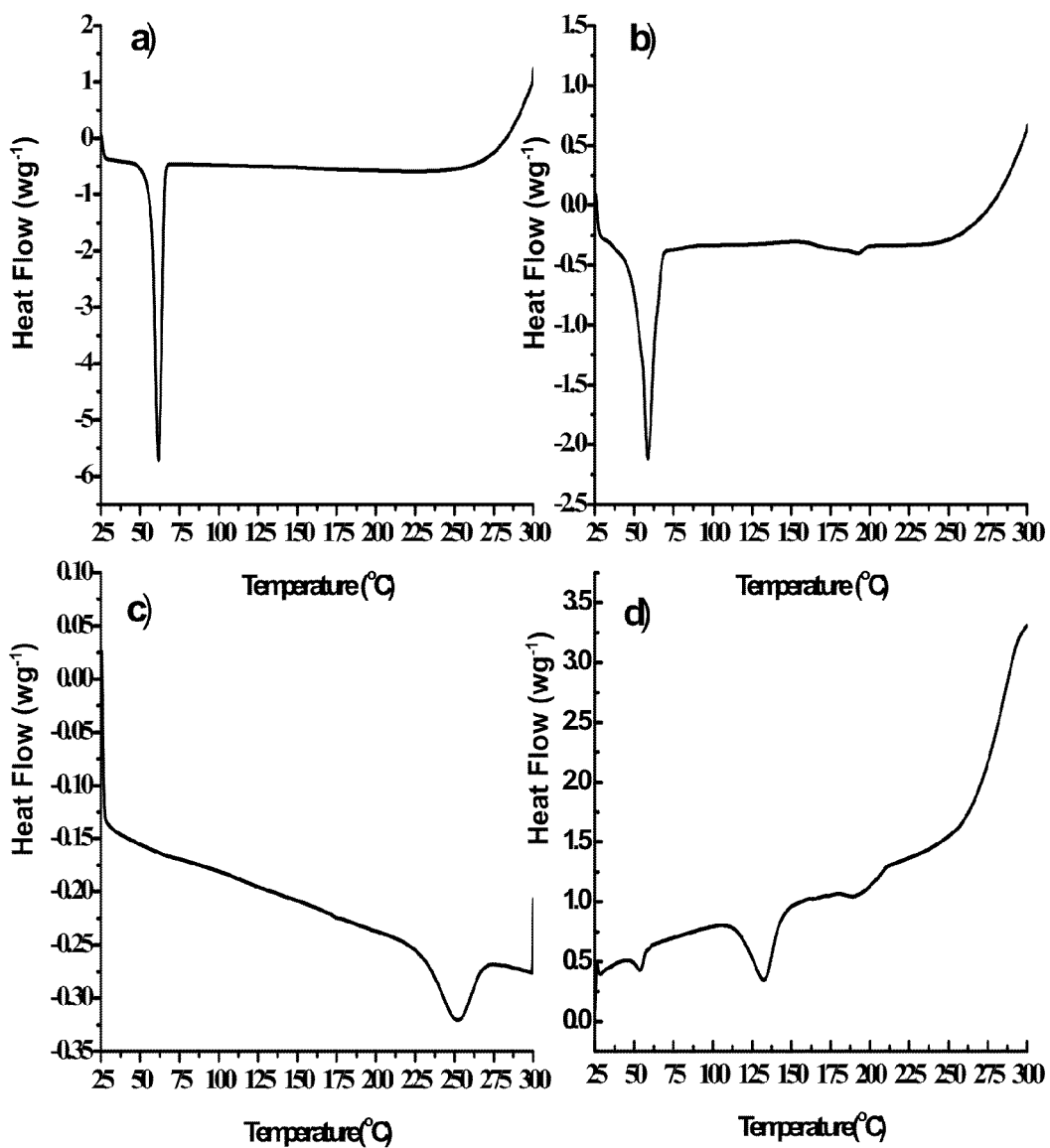
FIGS. 17A-D are graphical depictions of DSC heating scans for TCDA (FIG. 17A), poly-TCDA (FIG. 17B), ZnO (<100 nm) powder (FIG. 17C) and poly-TCDA-ZnO (FIG. 17D) in accordance with an embodiment of the presently disclosed subject matter.

Differential Scanning Calorimetry (DSC) measurements. Now referring to FIGS. 17A-D, DSC measurements were performed to provide further investigation of the nature of interaction between TCDA/poly-TCDA and ZnO. DSC data were obtained for pure TCDA monomer, poly-TCDA, and poly-TCDA-ZnO, at heating and cooling rates of 10° C. min$^{-1}$ between 25° C. and 300° C. The heating scan for pure TCDA in FIG. 17A shows an endothermic peak at 61° C. due to melting. On cooling, (scan not shown) down-shifted exothermic crystallization peaks at 59° C. due to hysteresis were observed. FIG. 17B shows an endothermic peak at 61° C. due to melting of the unpolymerized monomer. A broad endotherm with a shoulder at 154° C. and a peak 190° C. are assigned to the melting of poly-TCDA. On cooling (scan not shown), polymer crystallization is indicated by broad exothermic features at 159° C. and 194° C. which are upshifted due to hysteresis relative to the corresponding endothermic melting peaks. Crystallization of unpolymerized monomer were not observed during the cooling cycle probably due to loss of the monomer by sublimation during thermal cycling. The heating scan for poly-TCDA-ZnO (FIG. 17D) shows an endotherm at around 57° C. due to unpolymerized monomer and a new endothermic feature at 132° C. due to melting of the monomer modified by the chelate formation discussed above, the broad exothermic features between 159° C. and 209° C. which could refer to that of poly-TCDA are assigned to the melting of poly-TCDA. The new endothermic peak in poly-TCDA-ZnO is consistent with the FTIR and temperature dependent Raman spectra discussed above suggesting an interaction of ZnO particles with the head group of the polymer side-chain to form a chelate which can be schematically written as: $Zn^{2+}(COO^-)_2$. The temperature dependent Raman and DSC results also indicate the inkjet printing does not affect the interaction between TCDA and ZnO. On depositing material on a substrate, the ZnO particles are uniformly distributed.

Figure 18:
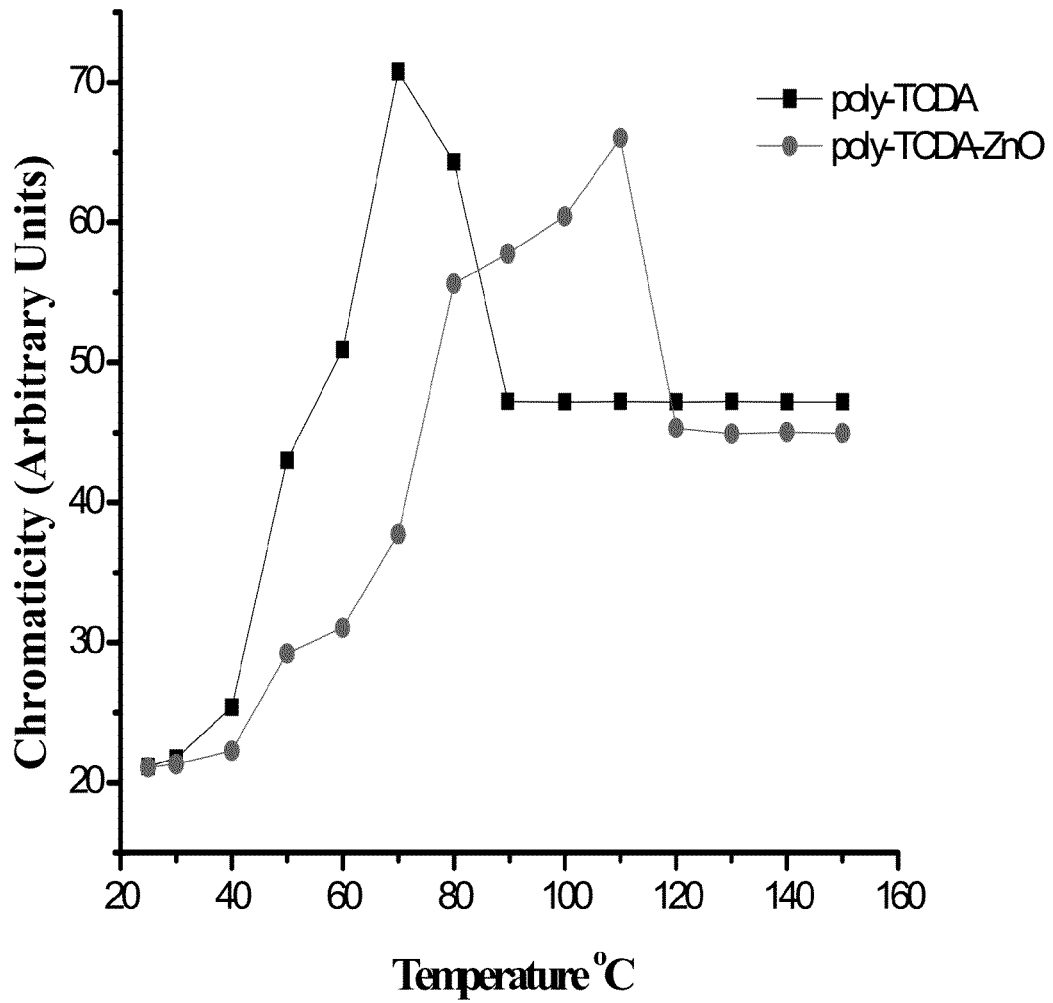
FIG. 18 is a graphical depiction of chromaticity versus temperature plots for poly-TCDA and poly-TCDA-ZnO composite film in accordance with an embodiment of the presently disclosed subject matter.

Optical densitometry. Now referring to FIG. 18, changes in chromaticity as a function of temperature for different samples are depicted. The rapid increase followed by a drop of the chromaticity of poly-TCDA is caused by the chromatic transition near 70° C. For poly-TCDA with 2.5 wt % ZnO, the chromatic transition temperature increases to 110° C. The poly-TCDA film fabricated by the disclosed inkjet printing methods is very similar to that of poly-TCDA prepared according to Experiment 1, however, the chromaticity of the poly-TCDA/ZnO film reaches a maximum at 110° C. which is 10° C. lower than that of poly-TCDA/ZnO (5 wt %). The discrepancy is probably caused by the lower concentration of ZnO to form chelate. Because there is not enough ionic bond between $Zn^{2+}$ and the head group of TCDA to assist the thermal-stress release, reversible color change of poly-TCDA/ZnO could be limited under certain temperature. According to the temperature dependent Raman spectra and chromaticity as a function of temperature plots, 80° C. may be a suitable temperature at which the thin film bears the reversibility of chromatic transition.

Figure 19:
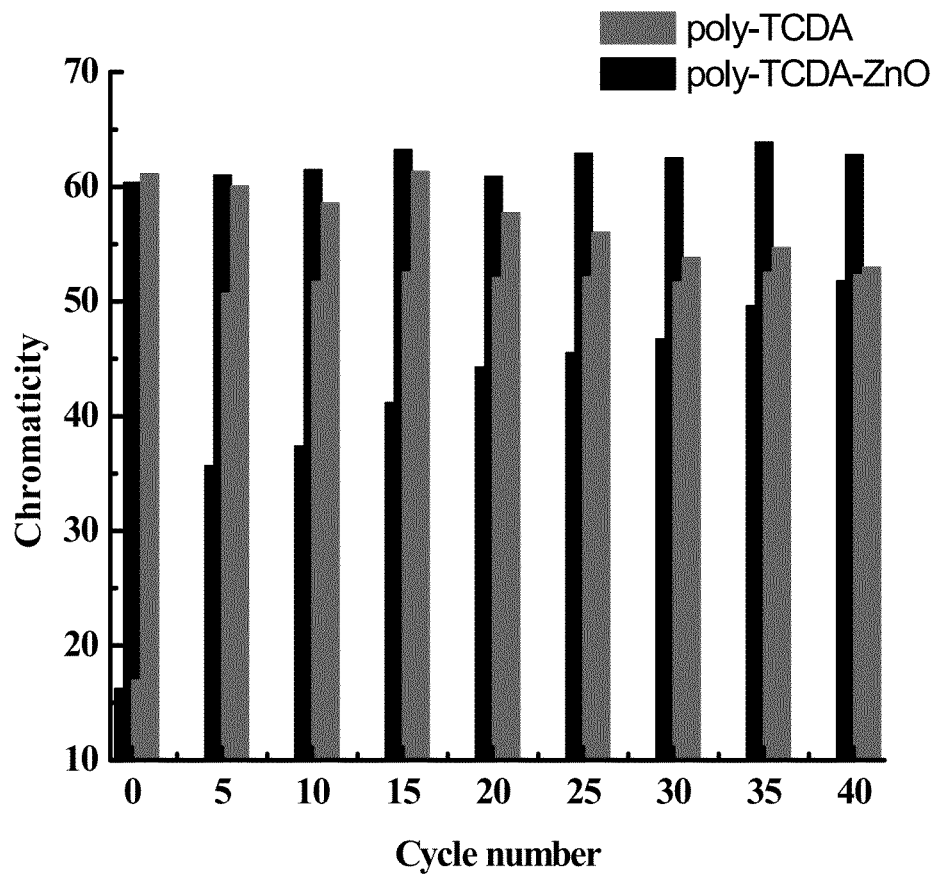
FIG. 19 is a graphical depiction of difference of chromaticity of poly-TCDA and poly-TCDA-ZnO every five heating-cooling cycles in accordance with an embodiment of the presently disclosed subject matter.

Now referring to FIG. 19, differences of chromaticity of material in blue phase and red phase after every five heating-cooling cycles are shown. Poly-TCDA barely bears chromatic reversibility after the first five cycles (by naked eye), and after 20 cycles the difference of chromaticity at 80° C. and 25° C. cannot be differentiated by optical densitometer. By contrast, poly-TCDA-ZnO demonstrates a fairly good chromatic reversibility until 40 thermal cycles.

Figure 20A:
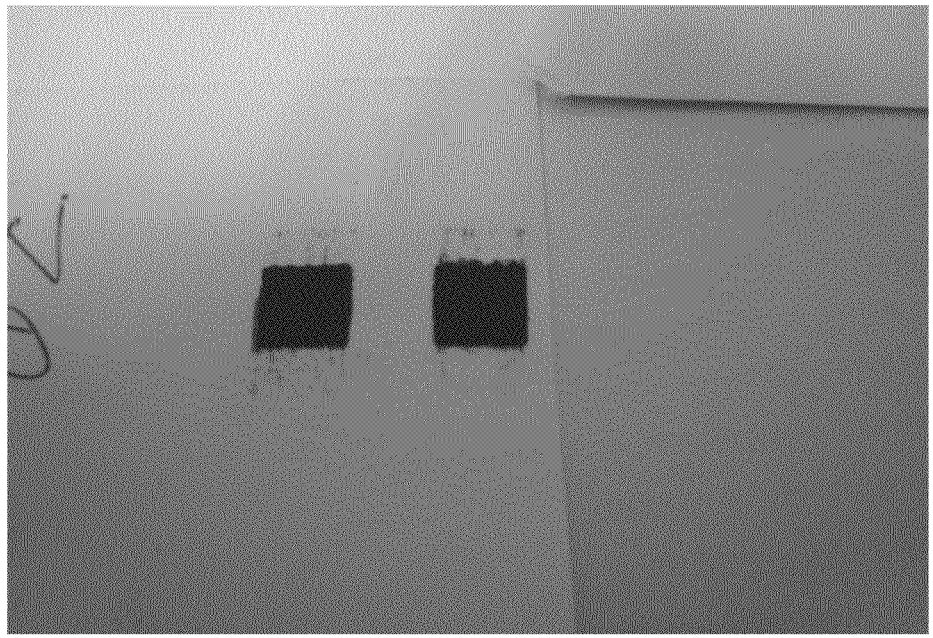
FIGS. 20A-D are photographic depictions of 5 mm×5 mm square patterned poly-TCDA and poly-TCDA-ZnO fabricated by inkjet printing (5-layer printing): poly-TCDA-ZnO at room temperature (FIG. 20A); poly-TCDA-ZnO at 80° C.
Figure 20B:
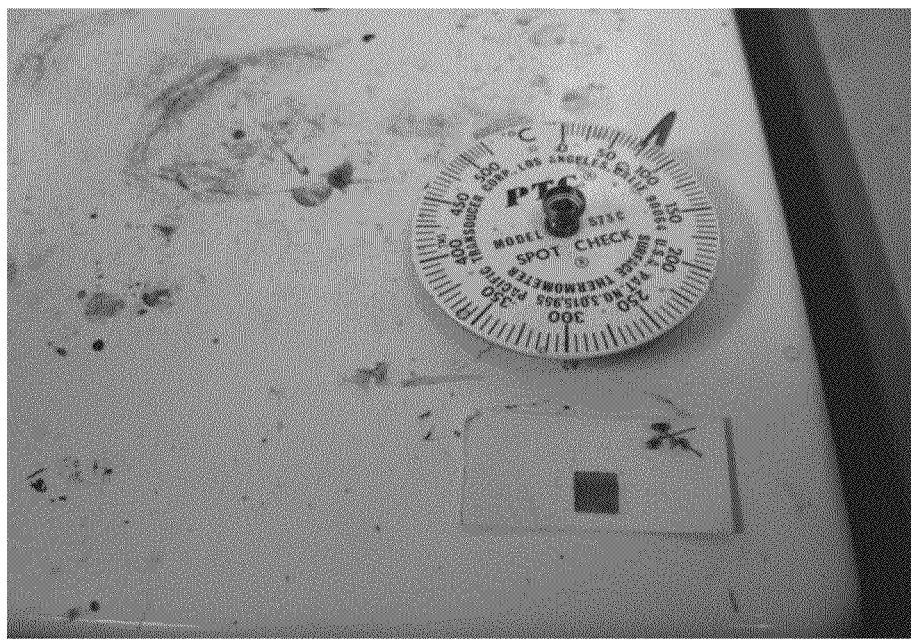
Figure 20C:
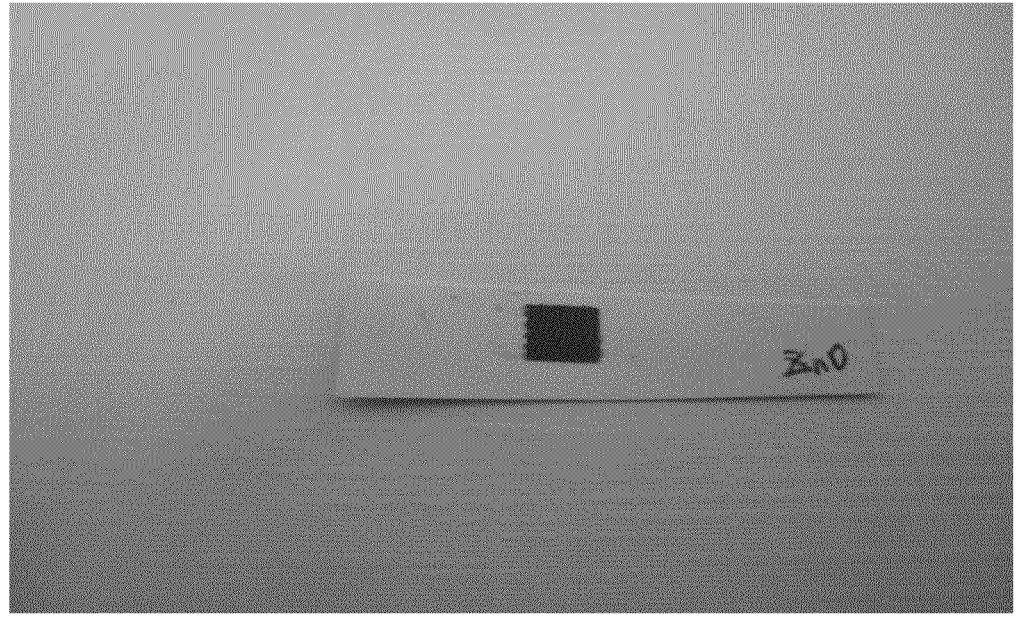
Figure 20D:
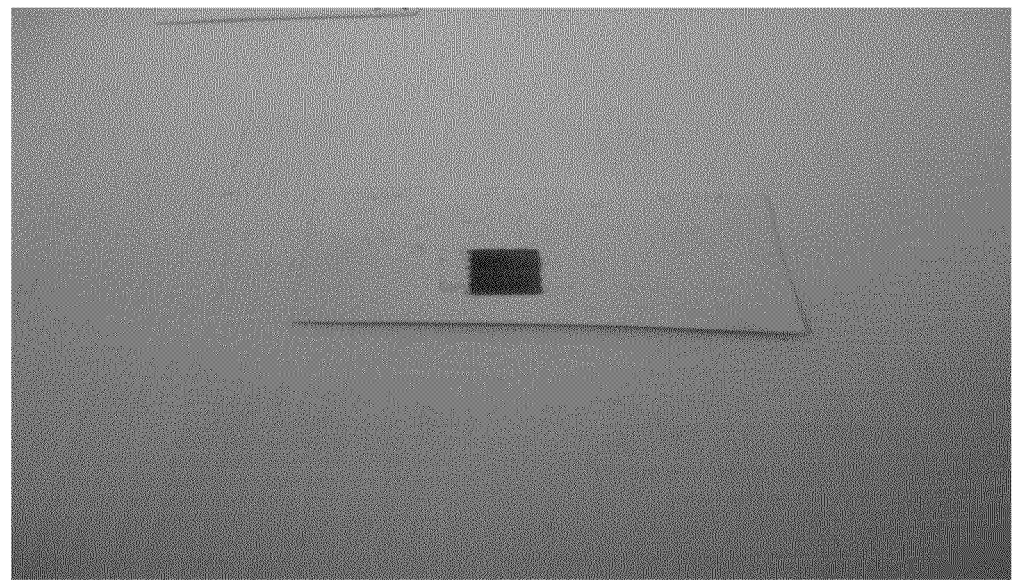

Now referring to FIGS. 20A-D, poly-TCDA/poly-TCDA-ZnO samples fabricated by inkjet printing on paper which were used for the chromaticity measurement are depicted. FIGS. 20A and 20B demonstrate the color of poly-TCDA-ZnO at room temperature and 80° C. (poly-TCDA are not shown), respectively. For poly-TCDA-ZnO (FIG. 20C) at 25° C., after 40 cycles, a partial region is red color (by naked eye), which could be caused by the lack of ZnO to strengthen the poly-TCDA backbone. That red region could be responsible for the increase of chromaticity of poly-TCDA-ZnO at room temperature after certain thermal cycles. FIG. 20D shows the inkjet printed poly-TCDA after 5 thermal cycles. The small blue region could explain the chromaticity difference in FIG. 19.

QR Codes

A QR code is a kind of matrix symbol, which was developed by the company Denson-Wave in 1994. Compared with conventional bar codes, QR code has the following features:

Large data capacity: A QR code can store 7,089 numeric characters and 4,296 alphanumeric characters, and 1,817 kanji characters;

Fast speed scanning: A mobile phone with camera function can obtain the content from a QR code quickly and easily;

Small printout size: QR codes carry data both horizontally and vertically, thus QR codes are better than 1D barcodes in data capacity;

Advance error correcting: Even if 50% areas of code are damaged, QR codes still can be recognized correctly;

Freedom of direction in scanning: The scanning direction of QR code is arbitrary.

While QR codes have become a standard for tracking, sorting and cataloging inventory, the functionality and utility could be increased by incorporating a sensory capability within the QR code.

Figure 21A:
FIGS. 21A-21B are photographic depictions of QR codes with partial area of poly-TCDA/ZnO fabricated by inkjet printing methods in accordance with an embodiment of the presently disclosed subject matter.
Figure 21B:
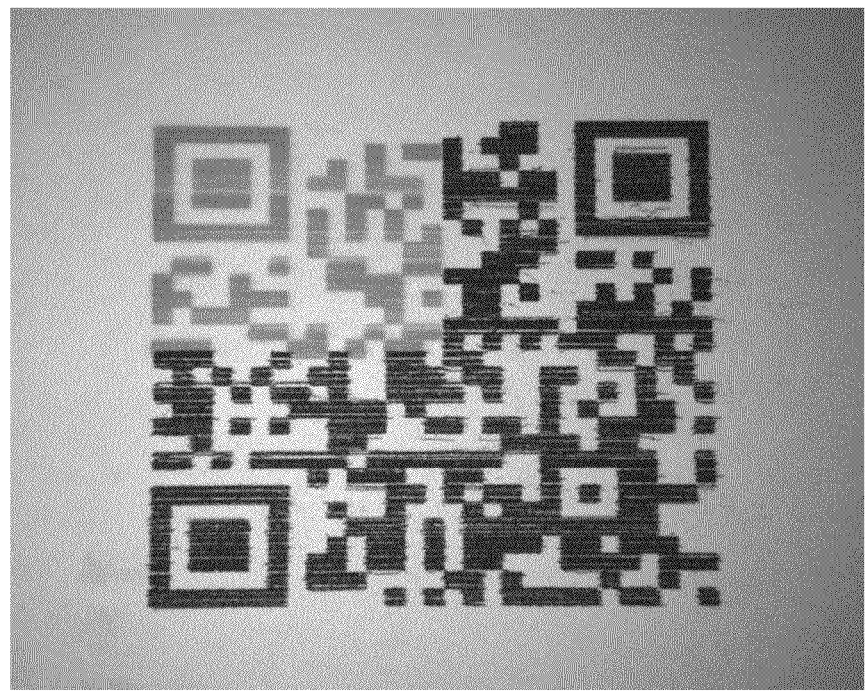

Provided herein are QR codes and methods of producing same including one or more portions of the QR code including a chromatic ink to sense various stimuli such as temperature, stress and chemical presence. With reference to FIGS. 21A and 21B, thermal sensor type QR codes are shown as 1 inch×1 inch codes printed on conventional printing paper. One skilled in the art will recognize the inventive QR codes may be any suitable size and printed on any suitable substrate. These "Smart" QR codes may be read by a color sensitive QR code reader and not only recognize an information storage pattern but also a specific temperature. In the embodiments shown, only a portion of the designed pattern is printed using poly-TCDA/ZnO composites or poly-TCDA as a thermal sensor. The rest of the pattern is printed out with black ink. The QR code shows the ability of temperature sensing (from 25° C. to 80° C.) and the chromatic transition is reversible (for TCDA/ZnO composites). While not show, irreversible color change type poly-TCDA QR code has been successfully inkjet printed. It will be apparent to the skilled artisan that the entirety of the QR code may be printed using poly-TCDA/ZnO composites or poly-TCDA as a thermal sensor.

Although the systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention. All references cited and/or listed herein are incorporated by reference herein in their entireties.

REFERENCES

1. Champaiboon, T.; Tumcharern, G.; Potisatityuenyong, A.; Wacharasindhu, S.; Sukwattanasinitt, M., A polydiacetylene multilayer film for naked eye detection of aromatic compounds. *Sensors and Actuators B: Chemical* 2009, 139 (2), 532-537.
2. Descalzo, A. B.; Dolores Marcos, M.; Monte, C.; Martinez-Manez, R.; Rurack, K., Mesoporous silica materials with covalently anchored phenoxazinone dyes as fluorescent hybrid materials for vapour sensing. *Journal of Materials Chemistry* 2007, 17 (44), 4716-4723.
3. Janzen, M. C.; Ponder, J. B.; Bailey, D. P.; Ingison, C. K.; Suslick, K. S., Colorimetric Sensor Arrays for Volatile Organic Compounds. *Analytical Chemistry* 2006, 78 (11), 3591-3600.
4. Lu, Y.; Yang, Y.; Sellinger, A.; Lu, M.; Huang, J.; Fan, H.; Haddad, R.; Lopez, G.; Burns, A. R.; Sasaki, D. Y.; Shelnutt, J.; Brinker, C. J., Self-assembly of mesoscopically ordered chromatic polydiacetylene/silica nanocomposites. *Nature* 2001, 410 (6831), 913-917.
5. Muro, M. L.; Daws, C. A.; Castellano, F. N., Microarray pattern recognition based on PtII terpyridyl chloride complexes: vapochromic and vapoluminescent response. *Chemical Communications* 2008, (46), 6134-6136.
6. Rakow, N. A.; Suslick, K. S., A colorimetric sensor array for odour visualization. *Nature* 2000, 406 (6797), 710-713.
7. Robert, W. C.; Darryl, Y. S.; Matthew, S. M.; Eriksson, M. A.; Alan, R. B., Polydiacetylene films: a review of recent investigations into chromogenic transitions and nanomechanical properties. *Journal of Physics: Condensed Matter* 2004, 16 (23), R679.
8. Yuan, W.; Jiang, G.; Song, Y.; Jiang, L., Micropatterning of polydiacetylene based on a photoinduced chromatic transition and mechanism study. *Journal of Applied Polymer Science* 2007, 103 (2), 942-946.
9. Hammond, P. T.; Rubner, M. F., Thermochromism in Liquid Crystalline Polydiacetylenes. *Macromolecules* 1997, 30 (19), 5773-5782.
10. Huang, X.; Jiang, S.; Liu, M., Metal Ion Modulated Organization and Function of the Langmuir-Blodgett Films of Amphiphilic Diacetylene: Photopolymerization, Thermochromism, and Supramolecular Chirality. *The Journal of Physical Chemistry B* 2004, 109 (1), 114-119.
11. Peng, H.; Tang, J.; Pang, J.; Chen, D.; Yang, L.; Ashbaugh, H. S.; Brinker, C. J.; Yang, Z.; Lu, Y., Polydiacetylene/Silica Nanocomposites with Tunable Mesostructure and Thermochromatism from Diacetylenic Assembling Molecules. *Journal of the American Chemical Society* 2005, 127 (37), 12782-12783.
12. Peng, H.; Tang, J.; Yang, L.; Pang, J.; Ashbaugh, H. S.; Brinker, C. J.; Yang, Z.; Lu, Y., Responsive Periodic Mesoporous Polydiacetylene/Silica Nanocomposites. *Journal of the American Chemical Society* 2006, 128 (16), 5304-5305.
13. Ahn, D. J.; Chae, E.-H.; Lee, G. S.; Shim, H.-Y.; Chang, T.-E.; Ahn, K.-D.; Kim, J.-M., Colorimetric Reversibility of Polydiacetylene Supramolecules Having Enhanced Hydrogen-Bonding under Thermal and pH Stimuli. *Journal of the American Chemical Society* 2003, 125 (30), 8976-8977.
14. Kim, J.-M.; Lee, J.-S.; Choi, H.; Sohn, D.; Ahn, D. J., Rational Design and in-Situ FTIR Analyses of Colorimetrically Reversibe Polydiacetylene Supramolecules. *Macromolecules* 2005, 38 (22), 9366-9376.
15. Lee, S.; Kim, J. M., alpha-cyclodextrin: A molecule for testing colorimetric reversibility of polydiacetylene supramolecules. *Macromolecules* 2007, 40 (26), 9201-9204.
16. Park, H.; Lee, J. S.; Choi, H.; Ahn, D. J.; Kim, J. M., Rational Design of Supramolecular Conjugated Polymers Displaying Unusual Colorimetric Stability upon Thermal Stress. *Advanced Functional Materials* 2007, 17 (17), 3447-3455.

17. Yuan, Z.; Lee, C.-W.; Lee, S.-H., Reversible Thermochromism in Hydrogen-Bonded Polymers Containing Polydiacetylenes. *Angewandte Chemie* 2004, 116 (32), 4293-4296.
18. Gu, Y.; Cao, W.; Zhu, L.; Chen, D.; Jiang, M., Polymer mortar assisted self-assembly of nanocrystalline polydiacetylene bricks showing reversible thermochromism. *Macromolecules* 2008, 41 (7), 2299-2303.
19. Song, J.; Cisar, J. S.; Bertozzi, C. R., Functional Self-Assembling Bolaamphiphilic Polydiacetylenes as Colorimetric Sensor Scaffolds. *Journal of the American Chemical Society* 2004, 126 (27), 8459-8465.
20. Li, L. S.; Stupp, S. I., Two-Dimensional Supramolecular Assemblies of a Polydiacetylene. 2. Morphology, Structure, and Chromic Transitions. *Macromolecules* 1997, 30 (18), 5313-5320.
21. Yang, Y.; Lu, Y.; Lu, M.; Huang, J.; Haddad, R.; Xomeritakis, G.; Liu, N.; Malanoski, A. P.; Sturmayr, D.; Fan, H.; Sasaki, D. Y.; Assink, R. A.; Shelnutt, J. A.; van Swol, F.; Lopez, G. P.; Burns, A. R.; Brinker, C. J., Functional Nanocomposites Prepared by Self-Assembly and Polymerization of Diacetylene Surfactants and Silicic Acid. *Journal of the American Chemical Society* 2003, 125 (5), 1269-1277.
22. Baughman, R. H., Solid-state polymerization of diacetylenes. *Journal of Applied Physics* 1972, 43 (11), 4362-4370.
23. Lim, K. C.; Heeger, A. J., Spectroscopic and light scattering studies of the conformational (rod-to-coil) transition of poly(diacetylene) in solution. *The Journal of Chemical Physics* 1985, 82 (1), 522-530.
24. Chance, R. R.; Baughman, R. H.; Muller, H.; Eckhardt, C. J., Thermochromism in a polydiacetylene crystal. *The Journal of Chemical Physics* 1977, 67 (8), 3616-3618.
25. Patlolla, A.; Zunino, J.; Frenkel, A. I.; Iqbal, Z., Thermochromism in polydiacetylene-metal oxide nanocomposites. *Journal of Materials Chemistry* 2012, 22 (14), 7028-7035.
26. Lim, C.; Sandman, D. J.; Sukwattanasinitt, M., Topological Polymerization of tert-Butylcalix[4]arenes Containing Diynes. *Macromolecules* 2007, 41 (3), 675-681.
27. D. Tobjörk, R. Osterbacka, Paper Electronics, Advanced Materials, 23(2011) 1935-1961.
28. L. Nyholm, G. Nyström, A. Mihranyan, M. Stromme, Toward Flexible Polymer and Paper-Based Energy Storage Devices, Advanced Materials, 23(2011) 3751-3769.
29. A. C. Siegel, S. T. Phillips, M. D. Dickey, N. Lu, Z. Suo, G. M. Whitesides, Printable Electronics: Foldable Printed Circuit Boards on Paper Substrates (Adv. Funct. Mater. January 2010), Advanced Functional Materials, 20(2010) n/a-n/a.
30. U. Zschieschang, T. Yamamoto, K. Takimiya, H. Kuwabara, M. Ikeda, T. Sekitani, et al., Organic Electronics on Banknotes, Advanced Materials, 23(2011) 654-658.
31. A. Russo, B. Y. Ahn, J. J. Adams, E. B. Duoss, J. T. Bernhard, J. A. Lewis, Pen-on-Paper Flexible Electronics, Advanced Materials, 23(2011) 3426-3430.
32. M. C. Barr, J. A. Rowehl, R. R. Lunt, J. Xu, A. Wang, C. M. Boyce, et al., Direct Monolithic Integration of Organic Photovoltaic Circuits on Unmodified Paper, Advanced Materials, 23(2011) 3500-3505.
33. J. Jang, J. Ha, J. Cho, Fabrication of Water-Dispersible Polyaniline-Poly(4-styrenesulfonate) Nanoparticles For Inkjet-Printed Chemical-Sensor Applications, Advanced Materials, 19(2007) 1772-1775.
34. J.-H. Kang, Z. Xu, S.-M. Paek, F. Wang, S.-J. Hwang, J. Yoon, et al., A Dual-Polymer Electrochromic Device with High Coloration Efficiency and Fast Response Time: Poly (3,4-(1,4-butylene-(2-ene)dioxy)thiophene)—Polyaniline ECD, Chemistry—An Asian Journal, 6(2011) 2123-2129.
35. B. J. de Gans, P. C. Duineveld, U. S. Schubert, Inkjet Printing of Polymers: State of the Art and Future Developments, Advanced Materials, 16(2004) 203-213.
36. T. H. J. van Osch, J. Perelaer, A. W. M. de Laat, U. S. Schubert, Inkjet Printing of Narrow Conductive Tracks on Untreated Polymeric Substrates, Advanced Materials, 20(2008) 343-345.
37. Y. Oh, J. Kim, Y. J. Yoon, H. Kim, H. G. Yoon, S.-N. Lee, et al., Inkjet printing of Al2O3 dots, lines, and films: From uniform dots to uniform films, Current Applied Physics, 11(2011) S359-S363.
38. J. K. Lee, U. J. Lee, M.-K. Kim, S. H. Lee, K.-T. Kang, Direct writing of semiconducting polythiophene and fullerene derivatives composite from bulk heterojunction solar cell by inkjet printing, Thin Solid Films, 519(2011) 5649-5653.
39. B. Yoon, D.-Y. Ham, O. Yarimaga, H. An, C. W. Lee, J.-M. Kim, Inkjet Printing of Conjugated Polymer Precursors on Paper Substrates for Colorimetric Sensing and Flexible Electrothermochromic Display, Advanced Materials, 23(2011) 5492-5497.
40. J. Chuang, Y. Hu, H. Ko, A Novel Secret Sharing Technique Using QR Code, International Journal of Image Processing. 4(2010) 468-475.

What is claimed is:

1. A thermochromically reversible composition comprising 6 to 99.5 wt % of TCDA and ZnO nanoparticles wherein the ZnO nanoparticles have an average particle size of 0.01-99 nm.

2. The composition according to claim 1 comprising 20 to 99.5 wt % of TCDA.

3. The composition according to claim 1 comprising 50 to 97.5 wt % of TCDA.

4. The composition according to claim 1 comprising 85 to 97.5 wt % of TCDA.

5. The composition according to claim 1 comprising 0.5 to 94.0 wt % of ZnO.

6. The composition according to claim 1 comprising 0.5 to 80.0 wt % of ZnO.

7. The composition according to claim 1 comprising 2.5 to 50.0 wt % of ZnO.

8. The composition according to claim 1 comprising 2.5 to 15.0 wt % of ZnO.

9. The composition according to claim 1 wherein the ZnO nanoparticles have an average particle size of 0.1-99 nm.

10. The composition according to claim 1 wherein the ZnO nanoparticles have an average particle size of 0.1-15 nm.

11. The composition according to claim 1 consisting of TCDA and 0.5-94 wt % of ZnO.

12. The composition according to claim 1 consisting of TCDA and 0.5 to 80.0 wt % of ZnO.

13. The composition according to claim 1 consisting of TCDA and 2.5 to 50.0 wt % of ZnO.

14. The composition according to claim 1 consisting of TCDA and 2.5 to 15.0 wt % of ZnO.

15. The composition according to claim 1 wherein the TCDA comprises poly-TCDA.

16. A thermochromically reversible film sensor comprising poly-TCDA and ZnO nanoparticles disposed on a substrate wherein the ZnO nanoparticles have an average particle size of 0.01-99 nm and the film comprises 6 to 99.5 wt % of TCDA.

17. The thermochromically reversible film sensor according to claim 16 comprising the substrate and a film consisting of poly-TCDA and ZnO nanoparticles disposed on a substrate wherein the ZnO nanoparticles have an average particle size of 0.01-99 nm.

18. The thermochromically reversible film sensor according to claim 16 wherein the film consists of TCDA and 0.5-94 wt % of ZnO.

19. The thermochromically reversible film sensor according to claim 16 comprising a QR code.

20. A method of making a thermochromically reversible film comprising applying a thermochromically reversible composition comprising 6 to 99.5 wt % of TCDA and ZnO nanoparticles wherein the ZnO nanoparticles have an average particle size of 0.01-99 nm to a substrate and subjecting the thermochromically reversible composition to UV irradiation for a duration sufficient to convert at least a portion of the TCDA to poly-TCDA.

21. The method according to claim 20 comprising applying the thermochromically reversible composition to a substrate using an inkjet printer.

* * * * *